(12) United States Patent
Rosenberg et al.

(10) Patent No.: US 9,672,380 B2
(45) Date of Patent: *Jun. 6, 2017

(54) STACK FUSION ARCHITECTURE INCLUDING DISTRIBUTED SOFTWARE CLUSTERS TO ENABLE SOFTWARE COMMUNICATION SERVICES

(71) Applicant: Cisco Technology, Inc., San Jose, CA (US)

(72) Inventors: Jonathan Rosenberg, Freehold, NJ (US); Patrick Linskey, San Francisco, CA (US); Reinhardt Quelle, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/198,052

(22) Filed: Jun. 30, 2016

(65) Prior Publication Data

US 2016/0306998 A1    Oct. 20, 2016

Related U.S. Application Data

(63) Continuation of application No. 14/561,437, filed on Dec. 5, 2014, now Pat. No. 9,430,672.

(51) Int. Cl.
*H04L 9/32* (2006.01)
*G06F 21/62* (2013.01)
(Continued)

(52) U.S. Cl.
CPC ............ *G06F 21/6245* (2013.01); *G06F 8/60* (2013.01); *G06F 17/30864* (2013.01);
(Continued)

(58) Field of Classification Search
CPC .......... G06F 21/31; G06F 21/50; G06F 21/10; G06F 21/105; G06F 21/6245;
(Continued)

(56) References Cited

U.S. PATENT DOCUMENTS 7,466,810 B1    12/2008    Quon et al.
8,478,845 B2    7/2013    Agarwala et al.
(Continued)

OTHER PUBLICATIONS

Kaviani et al., "Cross-Tier Application & Data Partitioning of Web Applications for Hybrid Cloud Deployment", Middleware 2013—Lecture Notes in Computer Science vol. 8275, 2013, pp. 226-246, Dec. 2013.
(Continued)

*Primary Examiner* — Hosuk Song
(74) *Attorney, Agent, or Firm* — Edell, Shapiro & Finnan, LLC

(57) ABSTRACT

A stack fusion architecture enables a cloud provider to provide Software-as-a-Service (SaaS) offerings to multiple organizations. Each organization operates a Infrastructure-as-a-Service (IaaS) platform and is associated with an organization domain. A cluster of software/communication services is deployed to each platform. Each IaaS platform is deployed to a data center and includes compute, storage, and network resources and an IaaS operating system. Users registered to an organization domain have access limited to the cluster uniquely associated with that domain. The architecture includes a globally accessible domain-to-cluster map used to map each cluster to the associated domain. A locally accessible user-to-cluster map is stored in each cluster to map that cluster to each user registered to the domain uniquely associated with that cluster. The architecture enables communication between users provisioned on different clusters and registered to different domains without exposing private information to the cloud provider.

17 Claims, 19 Drawing Sheets

(51) Int. Cl.

| | |
|---|---|
| *G06F 17/30* | (2006.01) |
| *H04L 29/06* | (2006.01) |
| *H04L 29/08* | (2006.01) |
| *H04L 12/18* | (2006.01) |
| *G06F 9/445* | (2006.01) |
| *H04L 12/58* | (2006.01) |
| *H04L 29/12* | (2006.01) |

(52) U.S. Cl.
CPC .... *G06F 17/30867* (2013.01); *H04L 12/1886* (2013.01); *H04L 51/28* (2013.01); *H04L 61/1511* (2013.01); *H04L 63/08* (2013.01); *H04L 63/102* (2013.01); *H04L 67/10* (2013.01)

(58) Field of Classification Search
CPC ... G06F 17/30867; H04L 63/01; H04L 63/08; H04L 63/101; H04L 63/102
USPC ................ 726/1–7, 26–30; 713/193; 705/51
See application file for complete search history.

(56) References Cited

U.S. PATENT DOCUMENTS

| | | | |
|---|---|---|---|
| 8,621,051 B2* | 12/2013 | Agarwala | G06F 9/5061 709/220 |
| 8,862,933 B2 | 10/2014 | Manglik et al. | |
| 9,047,133 B2* | 6/2015 | Winterfeldt | G06F 8/60 |
| 9,104,800 B2 | 8/2015 | Bragstad et al. | |
| 9,137,106 B2* | 9/2015 | McCarthy | H04L 41/0806 |
| 9,170,798 B2* | 10/2015 | Nagaraja | G06F 8/61 |
| 9,210,098 B2* | 12/2015 | Abuelsaad | H04L 47/70 |
| 9,430,672 B2* | 8/2016 | Rosenberg | H04L 12/1886 |
| 2009/0319781 A1 | 12/2009 | Byrum et al. | |
| 2016/0162701 A1 | 6/2016 | Rosenberg et al. | |

OTHER PUBLICATIONS

Zhang et al., "Sedic: Privacy-Aware Data Intensive Computing on Hybrid Clouds", CCS'11 Proceedings of the 18th ACM conference on Computer and communications security, Oct. 21, 2011, pp. 515-525.

Khadilkar et al., "Hybridizer: A Framework for Partitioning Workloads over Hybrid Clouds", Retrieved from https://utd.edu/~vvk072000/Research/Hybridizer/tech-report.pdf on Nov. 26, 2014, 31 Pages.

International Search Report and Written Opinion in counterpart International Application No. PCT/US2015/063869, mailed Mar. 11, 2016, 13 pages.

Wieland Alge, "Email in the cloud: the challenges and benefits", Computer Fraud and Security, vol. 2012, No. 7, Mar. 17, 2012, pp. 10-12, XP055254833, ISSN: 1361-3723, DOI: 10.1016/S1361-3723(12)70073-8, 3 pages.

Marco Carugi, ZTE Corporation P R China, "Draft deliverable on Introduction to the cloud ecosystem: definitionsm taxonomies, use cases, high level requirements and capabilities—Output of the FG Cloud #6 meeting, Geneva Jun. 27-Jul. 1 2011; Clo", ITU-T Draft; Study Period 2009-2012, International Telecommunication Union, Geneva, CH, vol. cloud, Jul. 11, 2011, pp. 1-88, XP017587068, (retrieved on Jul. 11, 2011).

* cited by examiner

1625

```
┌─────────────────────────────────────────────────────┐
│ SEARCH THE GLOBALLY ACCESSIBLE DOMAIN-TO-CLUSTER    │──── 1705
│ MAP FOR AN ORGANIZATION DOMAIN THAT MATCHES A       │
│ DOMAIN OF THE USER EMAIL ADDRESS                    │
└─────────────────────────────────────────────────────┘
                         │
                         ▼
┌─────────────────────────────────────────────────────┐
│ IF THE SEARCH IN 1705 FINDS AN ORGANIZATION DOMAIN  │──── 1710
│ THAT MATCHES THE DOMAIN OF THE USER EMAIL ADDRESS,  │
│ CONSTRUCT AN ADDRESS FOR THE REQUESTED SOFTWARE     │
│ SERVICE BASED ON THE CLUSTER MAPPED TO THE FOUND    │
│ ORGANIZATION DOMAIN, WHICH VECTORS THE SEARCH       │
│ TO THAT CLUSTER (GO TO NEXT OPERATION 1715)         │
└─────────────────────────────────────────────────────┘
                         │
                         ▼
┌─────────────────────────────────────────────────────┐
│ SEARCH THE LOCALLY ACCESSIBLE USER-TO-CLUSTER       │──── 1715
│ MAP IN THE MAPPED CLUSTER FOR THE USER IDENTIFIER,  │
│ AND IF THE USER IDENTIFIER IS FOUND IN THE LOCALLY  │
│ ACCESSIBLE USER-TO-CLUSTER MAP, ACCESS THE          │
│ REQUESTED SOFTWARE SERVICES ON THAT CLUSTER         │
└─────────────────────────────────────────────────────┘
                         │
                         ▼
┌─────────────────────────────────────────────────────┐
│ IF THE SEARCH OF THE GLOBALLY ACCESSIBLE            │──── 1720
│ DOMAIN-TO-CLUSTER MAP AT 1705 DOES NOT FIND         │
│ AN ORGANIZATION DOMAIN THEREIN THAT MATCHES         │
│ THE DOMAIN OF THE USER EMAIL ADDRESS, SEARCH        │
│ THE CONSUMER ORGANIZATION USER-TO-CLUSTER           │
│ MAP FOR A CLUSTER THAT IS MAPPED TO THE USER        │
│ EMAIL ADDRESS                                       │
└─────────────────────────────────────────────────────┘
                         │
                         ▼
┌─────────────────────────────────────────────────────┐
│ IF THE SEARCH OF THE CONSUMER ORGANIZATION          │──── 1725
│ USER-TO-CLUSTER MAP AT 1720 FINDS A CLUSTER         │
│ MAPPED TO THE USER EMAIL ADDRESS, CONSTRUCT AN      │
│ ADDRESS FOR THE REQUESTED SOFTWARE SERVICE          │
│ BASED ON THE CLUSTER MAPPED TO THE USER EMAIL       │
│ ADDRESS, WHICH VECTORS ACCESS TO THE SERVICE IN     │
│ THE CLUSTER                                         │
└─────────────────────────────────────────────────────┘
                         │
                         ▼
┌─────────────────────────────────────────────────────┐
│ ACCESS THE REQUESTED SOFTWARE SERVICE IN THE        │──── 1730
│ CLUSTER MAPPED TO THE USER EMAIL ADDRESS            │
│ BASED ON THE CONSTRUCTED ADDRESS (FROM 1725)        │
└─────────────────────────────────────────────────────┘
```

FIG. 17 ns with the organization. A cluster of software services, including communication services, is deployed to each IaaS platform. Each cluster is uniquely associated with the organization that operates that IaaS platform. Each IaaS platform is deployed to a data center and includes compute, storage, and network resources and an IaaS operating system. Users that belong to each organization are provisioned on the cluster associated with that organization. The provisioning includes storing user information for each user only on the associated cluster. Users provisioned on different clusters are enabled to communicate with each other as if the users were part of a centralized cloud communication service, without sharing respective user information with the cloud provider.

STACK FUSION ARCHITECTURE INCLUDING DISTRIBUTED SOFTWARE CLUSTERS TO ENABLE SOFTWARE COMMUNICATION SERVICES

RELATED APPLICATION

This application is a continuation application of U.S. Non-Provisional application Ser. No. 14/561,437, filed Dec. 5, 2014, the entirety of which is incorporated herein by reference.

TECHNICAL FIELD

The present disclosure relates to cloud based real-time communications, also known as software as a service (SaaS).

BACKGROUND

Real-time communications services for business are available in two deployment models. One model, called on-premise, is a model wherein the Information Technology (IT) department of a company obtains software for providing communications services to their users. Premise-based deployment models have drawbacks. They require costly up-front licenses and IT projects to install and deploy. They have very slow upgrade cycles, with businesses often being many years behind the current release. They also typically struggle in providing business-to-business (b2b) communications.

In an alternative deployment model, referred to as cloud or software as a service (SaaS), a third party—the SaaS provider—builds and operates the server software. The SaaS model introduces difficulties, too. The communications software might run in a data center far away from the business customer, introducing latency. Another issue is that of data sovereignty. Communications services typically include storage and maintenance of personally identifiable information, including user accounts. Many businesses would prefer that personally identifiable user information and company corporate information reside in the corporate data center, not in the data centers of a third party that cannot (perhaps) be trusted as much.

BRIEF DESCRIPTION OF THE DRAWINGS

FIG. 17 is a flowchart of a "directing" operation from the method of FIG. 16, according to an example embodiment.

DESCRIPTION OF EXAMPLE EMBODIMENTS

Overview

Figure 1:
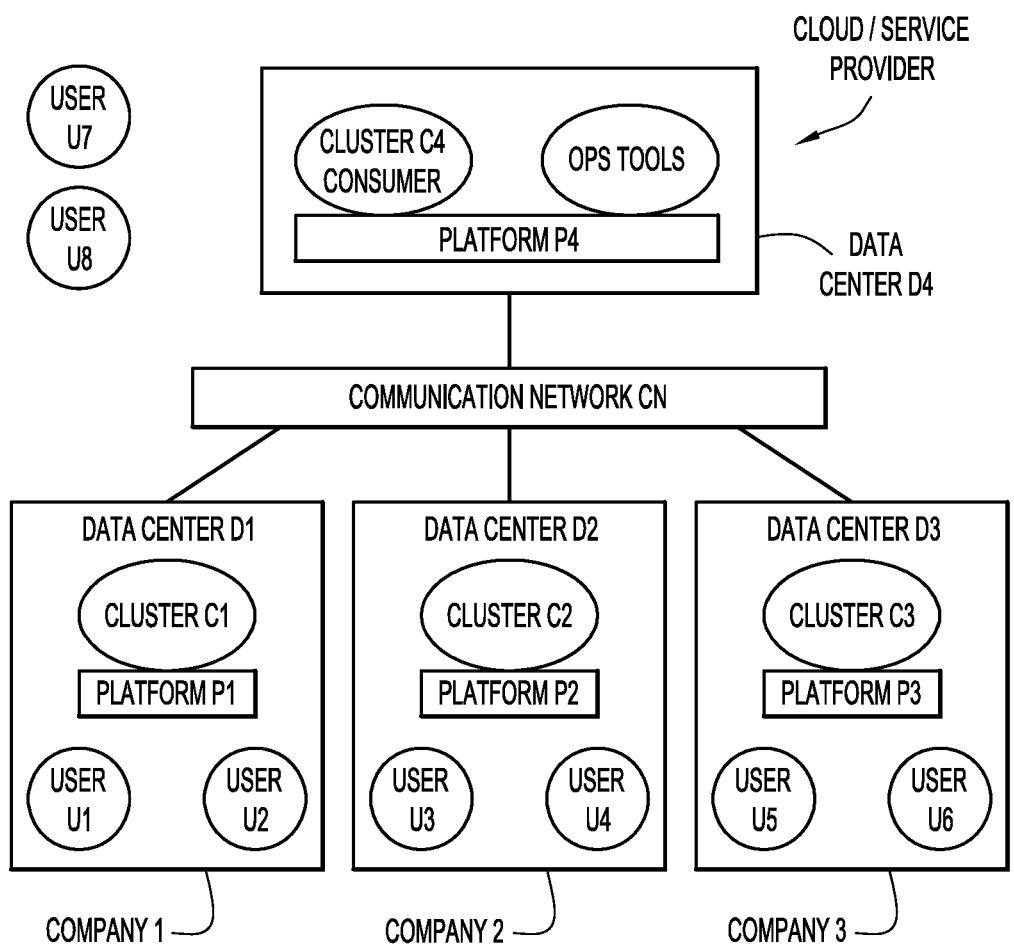
FIG. 1 is a block diagram of a deployment model of an example distributed services system or "stack fusion" system, according to an example embodiment.

Techniques presented herein facilitate a communications service that can be provided as a cloud service amongst a number of organizations. According to one technique, a cloud provider is configured to provide Software-as-a-Service (SaaS) offerings to multiple organizations. Each of the organizations operates a distinct Infrastructure-as-a-Service (IaaS) platform and is associated with at least one distinct organization domain associated with the organization. A cluster of software services, including communication services, is deployed to each IaaS platform. Each cluster is uniquely associated with the organization that operates that IaaS platform. Each IaaS platform is deployed to a data center and includes compute, storage, and network resources and an IaaS operating system. Users that belong to each organization are provisioned on the cluster associated with that organization. The provisioning includes storing user information for each user only on the associated cluster. Users provisioned on different clusters are enabled to communicate with each other as if the users were part of a centralized cloud communication service, without sharing respective user information with the cloud provider.

Example Embodiments

Introduction

Historically, real-time communications services for business have been available in two deployment models. One model, called on-premise, is a model wherein the Information Technology (IT) department of a company obtains software for providing communications services to their users. The IT department then installs the software on servers residing in their data centers, and then operates this software. This is the traditional deployment model for enterprise Internet Protocol (IP) communications services (also known as IP PBX or Unified Communications for the past 15 years). However, premise-based deployment models have drawbacks. They require costly up-front licenses and IT projects to install and deploy. They have very slow upgrade cycles, with businesses often being many years behind the current release. They also typically struggle in providing b2b communications.

More recently, an alternative deployment model has arisen. In this model, referred to as cloud or software as a service (SaaS), the IT department does not need to install or manage the software. Rather, a third party—the SaaS provider—builds and operates the server software. The IT department typically pays for this service on a monthly basis. The IT department can consume the service using Personal Computer (PC), mobile or tablet based soft clients, or by plugging in hard phones into the Internet. The hard phones automatically connect to the SaaS provider and enable service. SaaS services resolve many of the key drawbacks of premise software deployments. They require little upfront costs or time to deploy—the IT department can be operational within minutes. The SaaS provider handles software upgrades and typically provides service that is upgraded invisibly to the customers with great frequency. Most importantly, cloud communications services have proven extremely effective at business-to-business (b2b) communications. Since there is a common SaaS provider supporting multiple business customers, communications amongst those business customers is trivial.

However, the SaaS model introduces difficulties too. The communications software might run in a data center far away from the business customer, introducing latency. Latency is of critical importance particularly for communications applications which are far more sensitive to latency than many other applications. Furthermore, loss of Internet connectivity means that the business can no longer access communications services. Another issue is that of data sovereignty. Communications services typically include storage and maintenance of personally identifiable information, including user accounts. It also includes content—instant messages, shared documents, and meeting recordings—which contain highly sensitive corporate information. Many businesses would prefer that personally identifiable user information and company corporate information reside in the corporate data center, not in the data centers of a third party that cannot (perhaps) be trusted as much.

A better solution is possible.

Techniques are presented herein for facilitating a communications service that can be provided as a cloud service amongst a number of companies. Customers of this service can elect to have a portion of the software run within their own data centers. This software is still operated as a SaaS service by the cloud provider; it merely physically resides within the data center of the customer. Employees of that company are served by the software that runs within the data center of that company, and all communications between users of the same company remains within the boundaries of the company IP network. Furthermore, user data also remains within the boundaries of the company. However, users can freely communicate with users in other companies as if they were all part of the same cloud service; the service is completely borderless. Users exist within a single global namespace even though they are across multiple companies. Furthermore, users may consume the service directly from the cloud provider, and those users can communicate with users in any other company. The software as a whole has the properties of a SaaS offering. Analytics and metrics are fed from company data centers back to the cloud provider, and the cloud provider can remotely upgrade the software within each company without disruption in service. This capability I enabled primarily through a loosely federated identity service which allows for the global namespace with distributed user data, combined with a cluster-based Representational State Transfer (REST) architecture.

Architecture

With reference to FIG. 1, there is depicted a block diagram of a deployment model of an example distributed services system 100, according to an embodiment. System 100 is also referred to as a "stack fusion" system that implements stack fusion techniques presented herein. The system 100 includes a number of companies that opt into the service. The service includes a communications service, providing voice, video, conferencing, and messaging, and other features which involve communications between users. FIG. 1 shows three such companies, Company 1, 2, and 3. Companies 1, 2, and 3 deploy respective platforms P1, P2, and P3 within their respective data centers D1, D2, and D3. Each of platforms P1, P2, and P3 is an instance of an Infrastructure-as-a-Service (IaaS) platform. Examples of such platforms include Openstack. Each IaaS platform Pi (where i is 1, 2, and 3) includes/provides compute, storage and networking services for the respective data center Di. Typically, these types of platforms are deployed by public IaaS providers (for example, Rackspace), and anyone can access them. The platforms are also sometimes deployed as private clouds within an enterprise, in which case they are accessible only by enterprise IT. As depicted in FIG. 1, each platform Pi is deployed as part of a private cloud in that the platform runs within the respective company data center Di. However, the platform is made accessible to a cloud provider (depicted at the top of FIG. 1), that operates a data center D4, as a special tenant. To the cloud provider, each platform P1, P2, or P3 looks much like what a public IaaS would look like. The platform exposes REST-based Application Programming Interfaces (APIs) (though any other network based API would suffice), and the cloud provider can access those APIs to spin up virtual machines associated with the platform, install software on those virtual machines, create networks, and access local disk for storage. In the example of FIG. 1, an IT department in each data center D1, D2, or D3 is responsible for operating the respective platform P1, P2, or P3 and making sure its services, and the APIs which access it, are available to the cloud provider.

As mentioned above, the cloud provider operates data center D4, similar to the company data centers D1-D3. Data center D4 also has a dedicated platform P4. Platform P4 is ideally the same technology foundation as the ones within the company data centers D1-D3 (e.g., Openstack), but need not be. Services within data centers D1-D4 intercommunicate over a communication network CN, which may include wide area networks, such as the Internet, and local area networks.

The cloud provider deploys and operates a respective one of clusters C1, C2, and C3 on top of respective ones of company platforms P1, P2, and P3 in respective ones of data centers D1, D2, and D3. Also, a cluster C4 operates on platform P4 in data center D4 of the cloud/service provider. A cluster includes an "atomic" set of software which can reside within a single data center. The cluster typically includes load balancers, reverse Hypertext Transfer Protocol (HTTP) proxies (aka REST routers), application servers like chat servers, conferencing servers, content servers, and databases. The databases are used to store user information, including user profile data, user entitlements, along with user-generated content, such as chat, photos, videos, PPT documents, meeting recordings, and so on.

Each cluster is said to serve a specific set of users, which means the following:
  a. The profile data and user account information for those users resides in that cluster;
  b. When a set of users communicate with each other, if all of those users are served by the same cluster, only software within that cluster is utilized to service the communications;
  c. When a set of users communicate with each other, if all of those users are served by the same cluster, any content resulting from that communications—an instant message, a photo that is shared, or a meeting recording, is stored within the disks on the platform that operates that cluster; and
  d. When a set of users communicate with each other, yet they are in different clusters, only those clusters associated with those users are utilized—for compute, storage, or networking—for those communications.

These properties are paramount for providing the needed data sovereignty, survivability, security, and reliability properties that the stack fusion system needs to provide.

As seen in FIG. 1, users U1 and U2 are served by cluster C1 of data center D1 for company 1. Users U3 and U4 are served by cluster C2 of data center D2 for company 2. Users U5 and U6 are served by cluster C3 of data center D3 for company 3. The cloud provider has its own cluster, cluster C4, which resides on cloud provider platform P4. Users U5 and U6 are served directly by cluster C4. Users U7 and U8 may work for a company, but the users utilize the services of cluster C4 in the cloud provider. Cluster C4 services users which may reside across many different companies. Such multi-company users are all combined together and referred to as a "consumer" group. Thus, cluster C4, which serves the consumer group, is referred to as the "consumer" cluster.

As depicted in FIG. 1, platform P4 used by the cloud provider also supports operational tools "Ops Tools," which include scripts and software responsible for:
  a. Installing and upgrading software in all of the clusters;
  b. Receiving and processing analytics from each of the clusters; and
  c. Receiving and processing alerts from each of the clusters.

Figure 2:
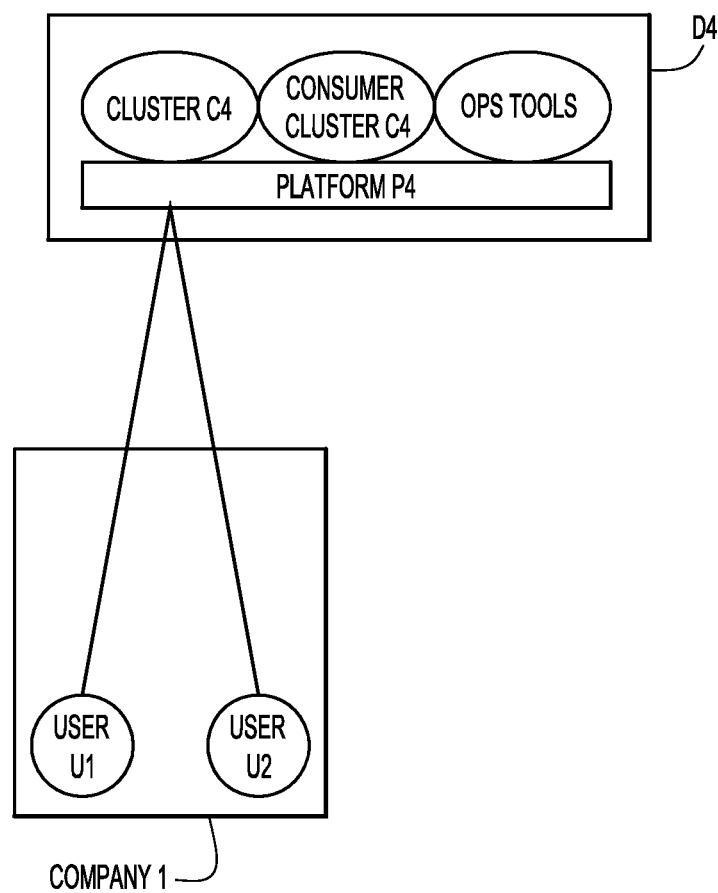
FIG. 2 is a block diagram of a variation of the deployment model depicted in FIG. 1, according to an example embodiment.

With reference to FIG. 2, there is a block diagram of a variation of the deployment model depicted in FIG. 1. In the variation depicted in FIG. 2, company 1 has dedicated cluster C1 to serve its own users; however, cluster C1 now resides alongside the consumer cluster C4 on platform P4 hosted in data center D4, operated by the cloud provider. The cloud provider may host many other such clusters, in addition to the consumer cluster.

Software Development

Figure 3:
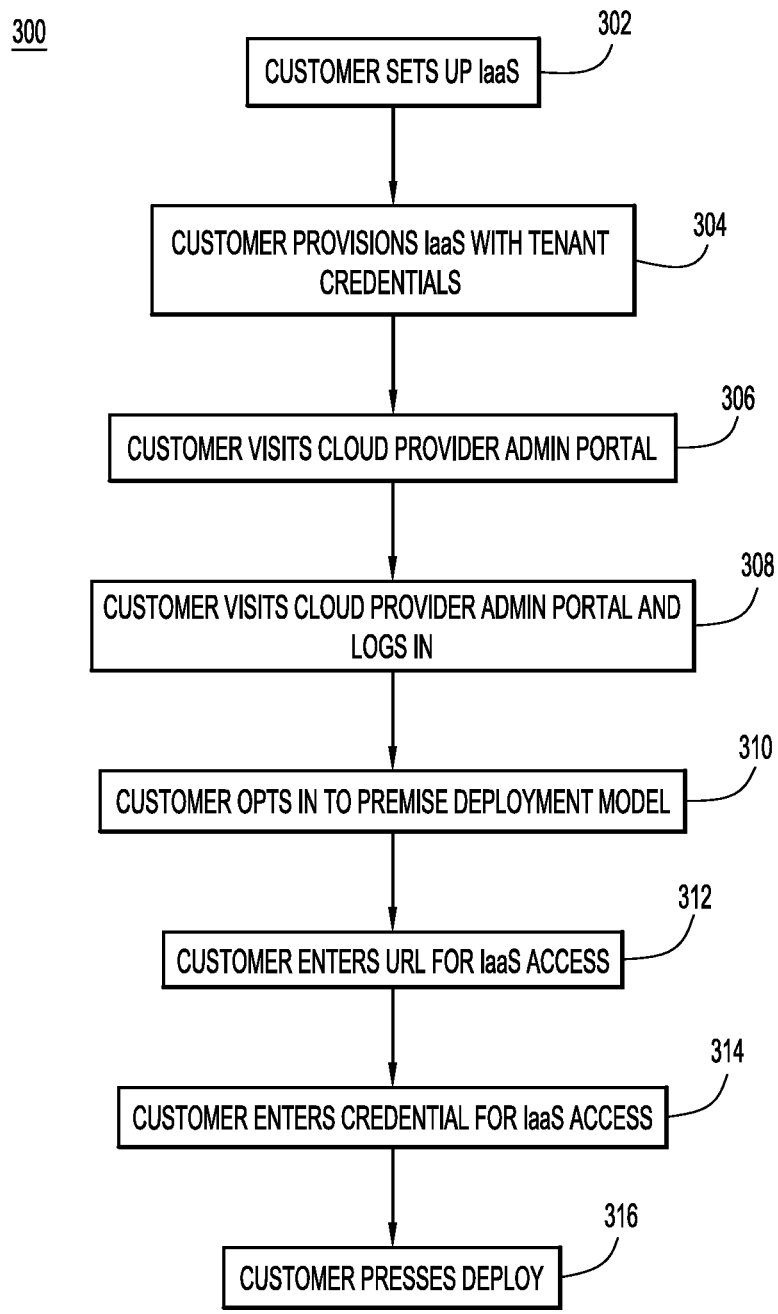
FIG. 3 is an example process of deploying software to a given cluster depicted in FIG. 1, according to an example embodiment.

Before services may be accessed by customers/users of a company that are served at a given data center (e.g., in data center D1), software that supports the services needs to be deployed to the cluster (e.g., cluster C1) in the data center. With reference to FIG. 3, there is depicted an example process 300 of deploying the software to a given cluster depicted in FIG. 1. The deployment process for a data center operated by a given company may be performed by an administrator in an IT department of the company. The administrator is referred to as the "admin."

First, at 302, the admin deploys a private cloud, or IaaS, in the data center. The admin will typically do this by installing servers (such as Cisco Unified Computing System (UCS)), network switches (such as a Cisco Nexus switch) and host attached disks. On top of these servers the admin installs an IaaS platform, such as Openstack. Openstack software provides APIs—accessed over REST—for spinning up Virtual Machines (VMs), installing software, creating networks, and accessing storage within the private cloud. This private cloud typically sits behind a corporate firewall, however the firewall may be configured with pinholes that allow inbound traffic towards the servers within the private cloud. The private cloud is also firewalled from the rest of a corporate network.

Figure 4:
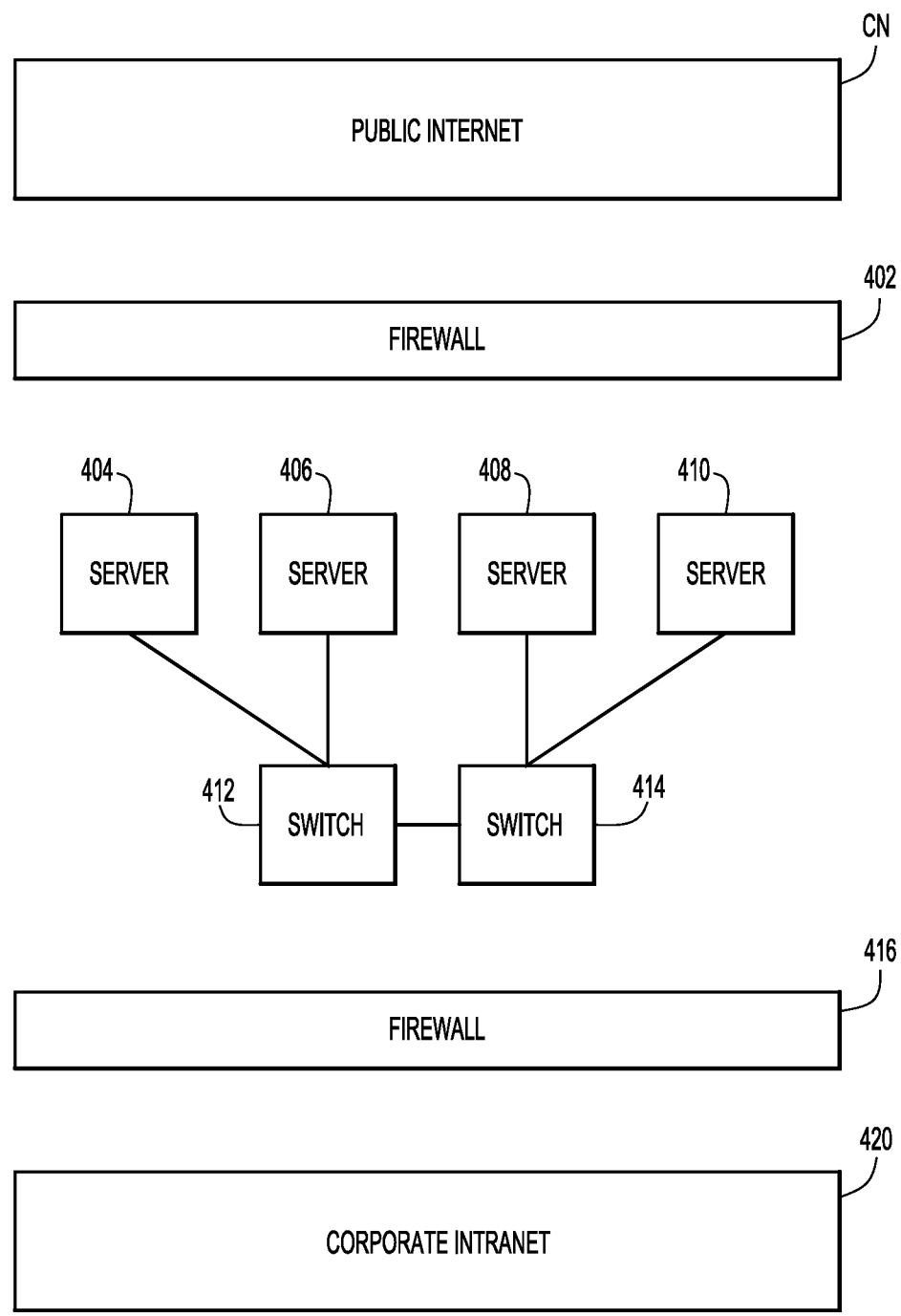
FIG. 4 is a typical deployment for a private cloud that results from the actions performed in the process of FIG. 3, according to an example embodiment.

With reference to FIG. 4, there is shown a typical deployment for a private cloud that results from the actions at 302. The private cloud of FIG. 4 includes a firewall 402 through which the private cloud access communication network CN, multiple servers 404-410, network switches 412-414, and a corporate firewall 416 through which the private cloud access a corporate Intranet 420.

Returning to FIG. 3, at 304, once the admin has set up the private cloud (e.g., as depicted in FIG. 4), the admin will provision a tenant into the private cloud. The result of this provisioning is a tenant username, tenant password, and set of policies defining the amount of compute, storage and networking resources that the tenant is allowed to access. Such provisioning is a standard capability for IaaS software platforms like Openstack.

Once provisioned, at 306, the admin visits a web portal provided by the cloud provider. The admin is a customer of the cloud provider, and has credentials to log into the cloud provider web portal. Typically, the admin has also purchased the appropriate entitlements that enable the admin to access the capabilities of this solution to be deployed on the private cloud (i.e., on the cluster hosted by the platform of the private cloud). At 308 and 310, the admin selects an icon presented on a web page of the web portal to activate deployment, which causes a step-by-step deployment process to begin. This takes the admin to a web page where, at 314, the admin enters in the credentials for the private cloud tenant they just provisioned. The admin also enters a Uniform Resource Locator (URL) for accessing the IaaS services. Finally, at 316, the admin selects to deploy the services.

Figure 5:
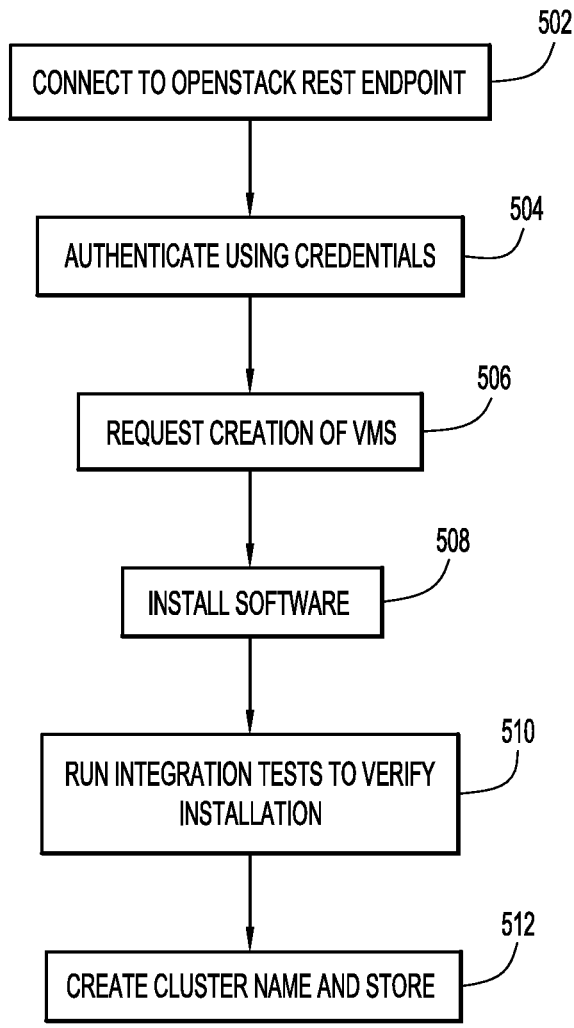
FIG. 5 is depicted an example process of installing and testing services in the private cloud that were provisioned by the process of FIG. 3, according to an example embodiment.

Once the admin selects to deploy the services, the operational tools, Ops Tools, in the cloud provider are activated to begin an installation and test process. With reference to FIG. 5, there is depicted an example process 500 of installing and testing services in the private cloud that were previously provisioned by the process of FIG. 3. At 502, the operational tools in the cloud provider, upon receipt of the final "deploy" button click, utilize the URL. This URL is basically the root URL for accessing Openstack in the private cloud, e.g. https://privatecloud.company.com. Because the REST APIs for Openstack are standardized, the cloud provider can create the URLs necessary to connect to the various REST endpoints which constitute the Openstack IaaS services. At 504, the scripts in the cloud provider will take the username and password, authenticate to the private cloud. Once authenticated, at 506, the scripts will then begin to spin up VMs, using the number of VMs required to install the minimum capacity of the cluster. At 508, the scripts then install the software, including databases, message buses, applications, and so on, as needed. Once installed, at 510, the scripts run a battery of automated tests. These automated tests utilize servers in the cloud provider data center which emulate clients, and connect to the software that was just installed in order to validate it. These tests are fully automated, and require no human intervention from the admin or from employees of the cloud provider.

Once the integration tests are complete, the software in the private cloud is operational and ready for use. At 512, a final step in the process is that the scripts in the cloud provider will create a cluster name. This cluster name is arbitrarily chosen, but must be a valid Domain Name System (DNS) name. An example of such a name might be sequential letters of the alphabet, e.g., "a," "b," etc.

Domain Claim

The next step in the process is domain claim. This is an optional step. However, if not done, the full privacy capabilities of the system may not be provided. In the domain claim process, the admin will visit the cloud provider portal once again to enter a domain name (also referred to as an "organization domain"), e.g., "company.com," of the company for which the admin is acting, i.e., the company that operates the data center that was provisioned by the admin in accordance with processes 300 and 500 of FIGS. 3 and 5. The web portal will utilize any of a number of common techniques for verifying that the admin/company does in fact have DNS ownership over the domain entered through the web portal. According to one such technique, the web portal visits the "WHOIS" record for the associated domain, search for and find the email address of the associated admin, and then send an email to the admin using the found email address, where the email provides a code. Once the admin receives the email, the admin must then enter the code into the web portal. Another technique is to request the admin to create a subdomain with a specific name which maps to a specific IP address. The admin will visit their domain provider site, make the configuration change, and then return to the cloud provider portal. The admin then selects an icon to "verify," which causes the web portal to do a DNS query for the requested subdomain, and verify that the IP address which is returned is the expected IP address.

Domain Mapping

Figure 6:
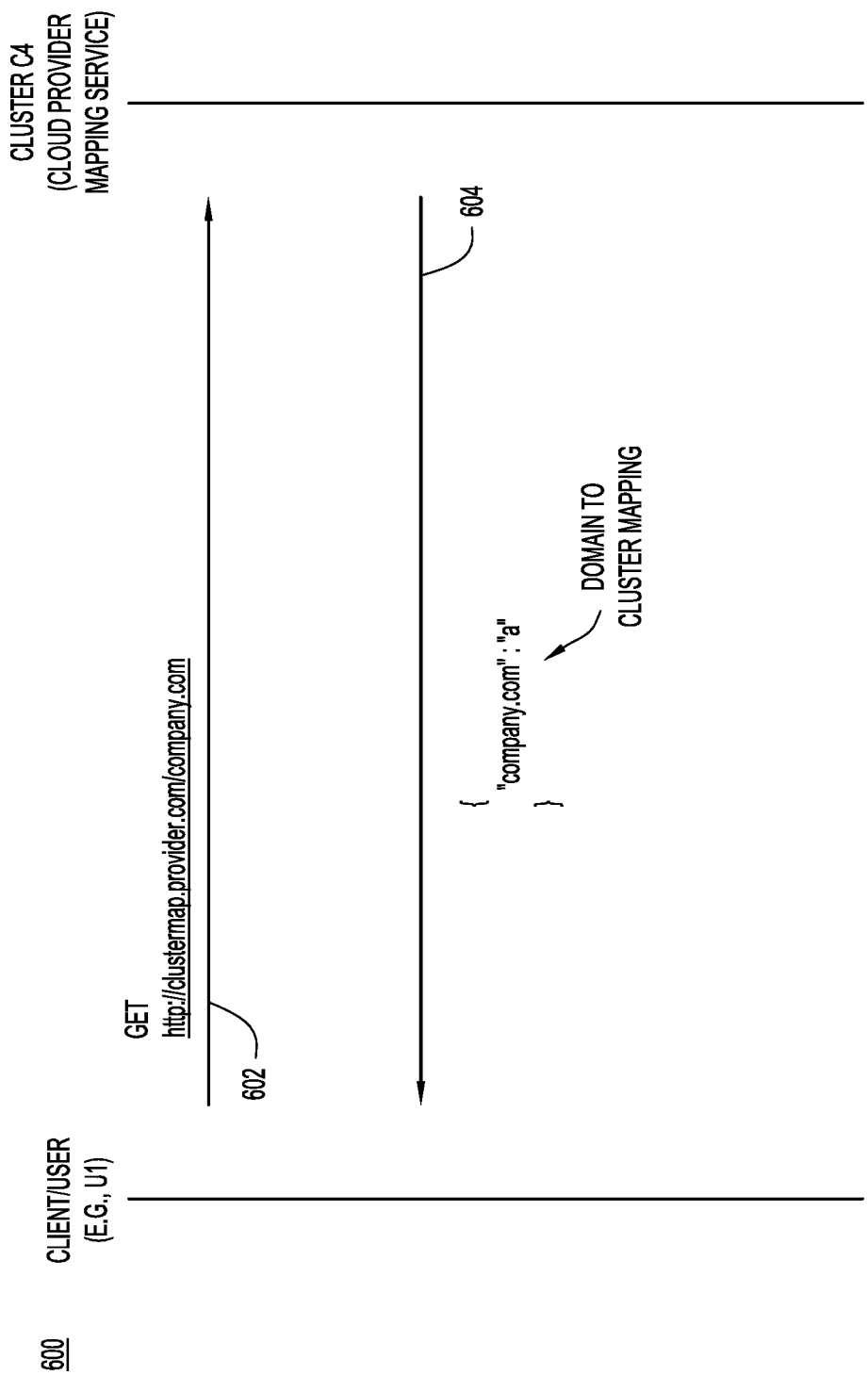
FIG. 6 is an example message transaction used to access domain-to-cluster map, according to an example embodiment.

Once the domain ownership is verified, the web portal stores, within the cloud provider, e.g., in cluster C4, a mapping referred to as a globally accessible "domain-to-cluster map." The domain-to-cluster map maps the claimed domain (e.g., company.com) to the cluster name that was created for the admin (e.g., "a"). This mapping is accessible as a REST endpoint within the cloud provider. With reference to FIG. 6, there is shown an example message transaction 600 used to access the domain-to-cluster map. At 602, a client/user issue an HTTP query to a URL of the form, e.g.:

GET http://clustermap.provider.com/company.com. The URL is directs to the domain-to-cluster map stored in cluster C4 of the cloud provider.

In response to the GET, the cloud provider uses a cloud provider mapping service that returns a message 604 including a payload that conveys the requested mapping. E.g., in a JavaScript Object Notation (JSON) or Extensible Markup Language (XML) body of the payload, the requested mapping may take the form:

{
"company.com": "a"
}

The web portal also creates a series of DNS records, of the following form, e.g.:

a-<server-name>.cloudprovider.com→IP address of server

So for example, if the scripts in the cloud provider had created a VM on one of the servers in the private cloud, and the IP address of the VM was 1.2.3.4, and the script installed server with the name "locus" on that VM, the script would create a DNS entry:

a-locus.cloudprovier.com→1.2.3.4

The way in which the domain-to-cluster mapping service and the associated DNS records are used will become more apparent later.

Identity Model

A key part of the system is the notion of users, and how those users are reached in the various clusters.

Users are identified by an email address, e.g., joe@example.com. The email address can be corporate provided, or the email address can be a public consumer service like Gmail or Yahoo.com email address.

There is also implemented the concept of an "org." An org is an administrative entity which manages policy for a group of users. This policy includes the ability to control user access to content, to control access to services, to force usage of corporate credentials, and the like. The org also includes the ability to pay for services for users. Most often, an org is a company. Typically, a company has authoritative ownership over one or more DNS domain names. For example, Cisco may be an org that would have authoritative ownership over the domains cisco.com, collaborate.com, insieme.com, and other domain names which Cisco owns or has acquired.

There is an important org which is called the "consumer org." The consumer org represents the cloud provider as the administrative entity. All users which are not under the control of a different org, fall within the consumer org. In a sense, the consumer org is, therefore, a "default org."

Through a process called domain claim, an administrator of an org proves that they are the DNS owner of a domain. Once proven, this entitles that admin the right to take authoritative ownership of some or all users with email addresses matching the claimed domain name.

Importantly, even when an org has claimed a domain, there still may be email addresses with that domain name not under that org. An example of this is a company that has purchases the cloud service for only some of its employees. The remaining employees can use the cloud service but as users in the "consumer org," in which case the users would not be subject to IT policy controls, nor would receive the benefits of IT payment for services.

In an embodiment, a domain can only ever be claimed by one org. The consumer org never has claims over any domain. An email address matching a claimed domain can only be in the org that claimed that domain, or in the consumer org.

Figure 11:
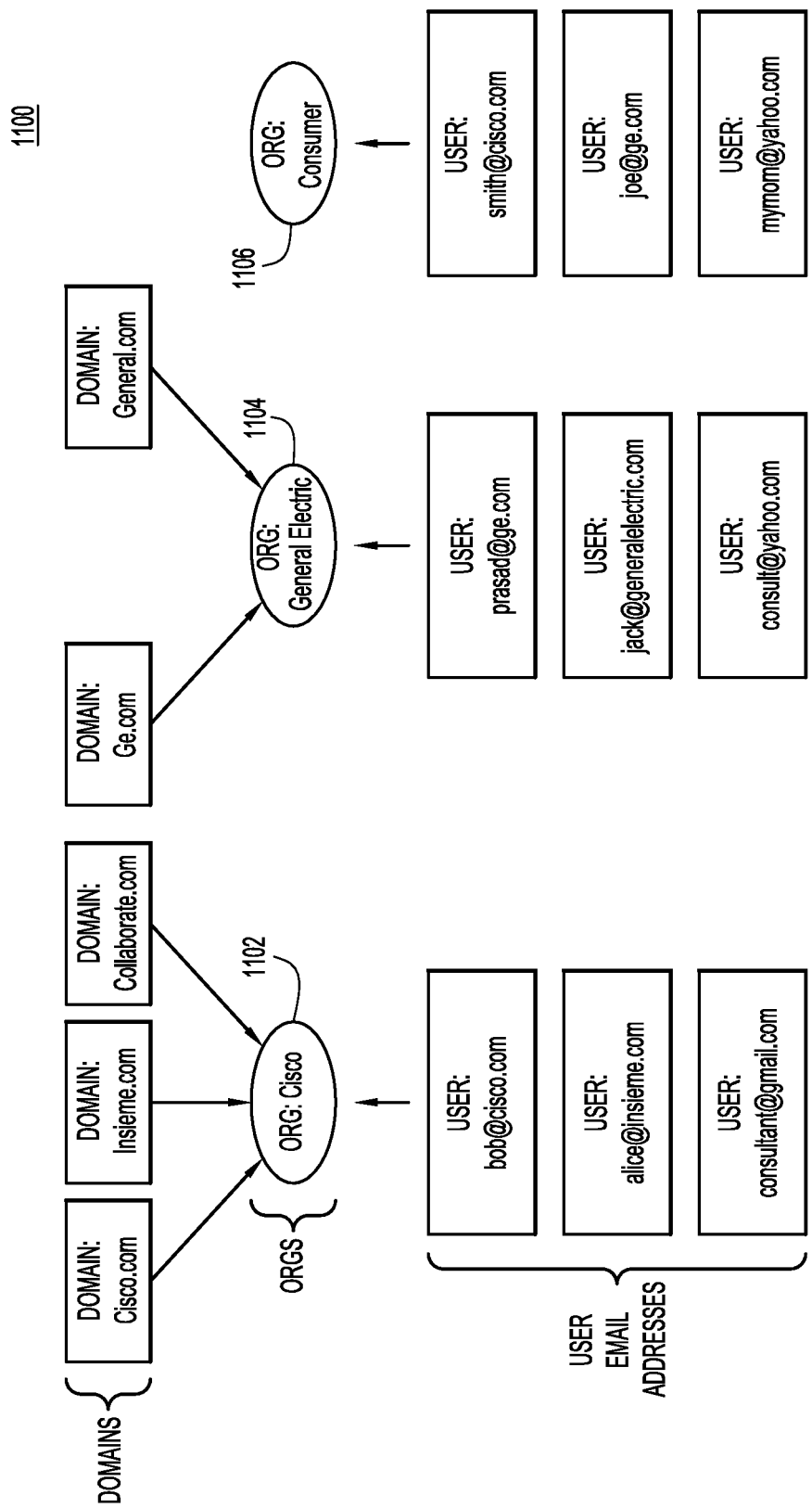
FIG. 11 is an illustration of an example diagrammatic identity model of orgs, users, and domains, according to an example embodiment.

With reference to FIG. 11, there is an illustration of an example diagrammatic identity model 1100 of orgs, users (identified by user email addresses), and domains. A Cisco org 1102 owns domain names (i.e., domains) Cisco.com, Insieme.com, and Collaborte.com. Thus, example users "Bob" and "Alice" associated with/belonging to the Cisco org domains Cisco.com and Insiene.com may be assigned and identified by email addresses such as Bob@cisco.com and Alice@insieme.com, respectively. Also, depicted in FIG. 11 is a General Electric org that owns domains Ge.com and General.com to which users "Prasad" and "Jack" belong, respectively. A consumer org 1106 is associated with the cloud provider. A Yahoo user "Mymom" belongs to the consumer org; however, users "Smith" and "Joe" belonging to the domains Cisco and Ge may also belong additionally to the consumer org.

This identity model has direct and important interactions with each cluster.

The consumer org is mapped to a multiplicity of clusters across data centers (e.g., across data centers D1-D4), for purposes of scale. This mapping is a function of the user. As such, there exists a mapping service in the data center(s) of the cloud provider, which can map a user email address (including the user name) to the cluster for that user, but only for email addresses in the consumer org.

In a similar way, a non-consumer org, such as a company org, can also have one or more clusters and the mapping of a (company) user to a specific cluster for that (company) org exists in a mapping service that exists ONLY in the clusters for that (company) org, not in the cloud provider; however, in an alternative embodiment, a "global" service exists which maps domain names to the clusters for that org. The "global" mapping service is considered global because the mapping service accessible from all of the clusters in the system.

Figure 12:
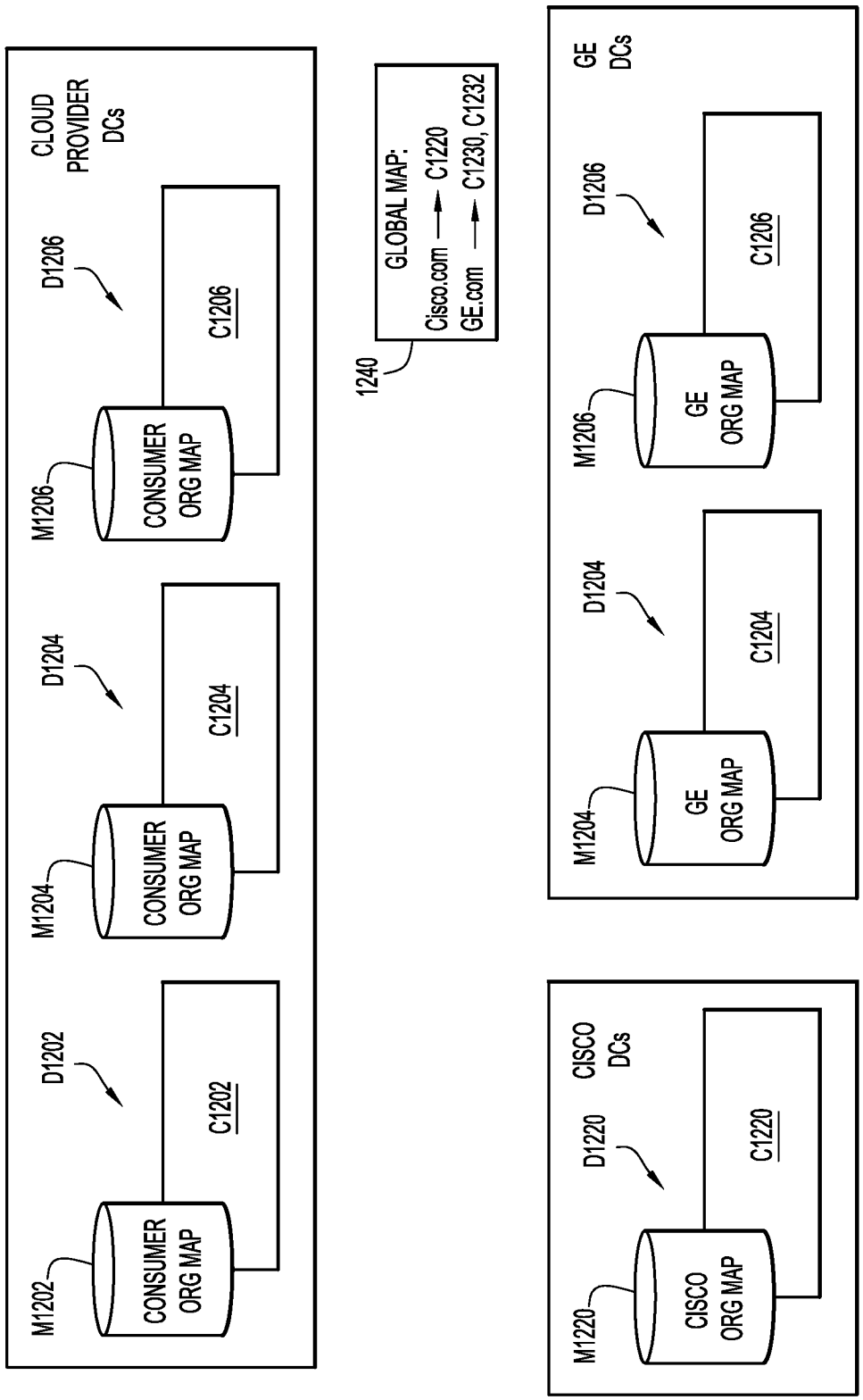
FIG. 12 is a block diagram of distributed mapping, according to an example embodiment.

With reference to FIG. 12, there is depicted a block diagram of distributed mapping as described above, according to an embodiment. Multiple cloud provider data centers (DCs) D1202, D1204, and D1206 host respective clusters C1202, C1204, and C1206, where each of the clusters accesses a respective one of local consumer org maps M1202, M1204, and M1206, which each map consumer org email addresses to the local (hosting) cluster. A Cisco org data center (DC) D1220 includes a Cisco cluster C1220 and a Cisco org map M1220. Cisco org map M1220 maps email addresses belonging to the Cisco org to Cisco cluster C1220 based on the user name identified in the email address. GE DCs 1230 and 1232 host respective clusters C1230 and C1232, where each of the clusters accesses a respective one of local Ge org maps M1230 and M1232, which each map Ge email addresses to the Ge clusters. A global domain-to-cluster map 1240 maps domains to clusters, e.g., Cisco.com to cluster C1220, and GE to clusters C1230 and C1232.

Together, the various maps provide and enable a distributed service which allows mapping of a user, identified by an email address of the user, into the cluster for that user.

Any user/client (which can be an end user piece of software, or a service in one of the clusters) which wants to resolve a user's email address into a service in a cluster for that user, performs the following steps:
 a. Query the global mapping service (e.g., using global domain-to-cluster map 1240) for the domain name in the email address, to see if the domain name represents a claimed domain;
 b. If the domain is claimed:
  i. The result will be a specific cluster. Construct the domain name for the service as <cluster-name>-<service>.cloudprovider.com/service-name/user;
  ii. Query the above URL. This is received by the service node in the targeted cluster. The service node looks up the user (i.e., the user name in the email address) in the user-to-cluster mapping service (e.g., using map M1220) for the org that resides on the cluster. Three cases:
   1. This user is served by this cluster: process the request;
   2. The user is not a user of this org: Generate a 3xx redirect (i.e., a URL redirection based on HTTP status codes 3xx) to one of the clusters in the consumer org (which is well known); and
   3. The user is a user of this org but served in a different cluster: Generate a 3xx redirect to the right cluster, known from the mapping service; and
  iii. Follow any redirects; and
 c. Else if the domain is not claimed:
  i. Query the mapping service in the consumer org, find the right cluster for this user. Construct the URL using the resulting cluster, and query it.

This architecture and logic is designed specifically to ensure some important data properties:
 a. User data for users claimed by an org, reside only in the data centers for that org;
 b. The cloud provider itself actually has no record in its own databases of all of the users (by user name) of the service; the list of users themselves—and the clusters which serve them—exist only in the data centers of the org; and
 c. A query to connect to the service for a user, if that user is claimed by an org, never needs to touch the cloud provider at all. This is because the map of claimed domains to clusters is distributed and exists in ALL clusters.

All of these data properties serve to meet data sovereignty requirements, so that the cloud provider has little record or visibility into the users actually using its service. Yet, we still provide global connectivity amongst users.

An alternative embodiment may be used as an optimization. In this optimization, the mapping service in the consumer org is also populated with the email addresses for users in all of the clusters in all domains. To provide privacy, the mapping uses a hash of the email address rather than the actual email address. Furthermore, this consumer map may be distributed to all clusters, not just the ones servicing the consumer org. In such an optimization, the domain to cluster map is always (or often) empty and the users are looked up in the user to cluster mapping service. This global user-to-cluster map does not contain any user information, because it is indexed with a hash over an infinitely large namespace (and is therefore not invertible).

End User Provisioning

The next step in the process is the provisioning operation. This is the process by which the admin now provisions individual end users into their system. To do that, the admin once again visits the web portal. The web portal provides means for entering the user email address, which resides within the domain claimed by the admin. For example, if the admin had claimed the domain company.com, the admin may then provision user Joe with email address joe@company.com. The admin may enter additional profile information or entitlements. Many other techniques for obtaining the email address and profile information might be provided, including syncing this information from the corporate directory, bulk spreadsheet uploads, and so on. User credentials may also be provided, or the user may instead log in with a single-sign on process using one of any of a number of industry standard federated identity systems.

One way or another, the user email address and profile data is obtained by the web portal. The web portal is a web server that operates within the data center of the cloud provider. This web server will return static content and JavaScript that execute within the admin's browser. Once the actual form data is collected to provision the user, the browser-side JavaScript will consult the mapping service, obtain the cluster name for the domain of the admin, and convert this into a URL for accessing the provisioning service. The provisioning service is one of the application server components that reside in each cluster. Here, the browser accesses this within the company cluster. It performs a provisioning operation by POSTing against the REST endpoint for the provisioning service. In an alternative embodiment, the provisioning service resides centrally, in the cloud provider's data center. It receives a REST request to provision the user, and it obtains the cluster name for the domain of the user, and then pushes the information into the database for the cluster.

Figure 7:
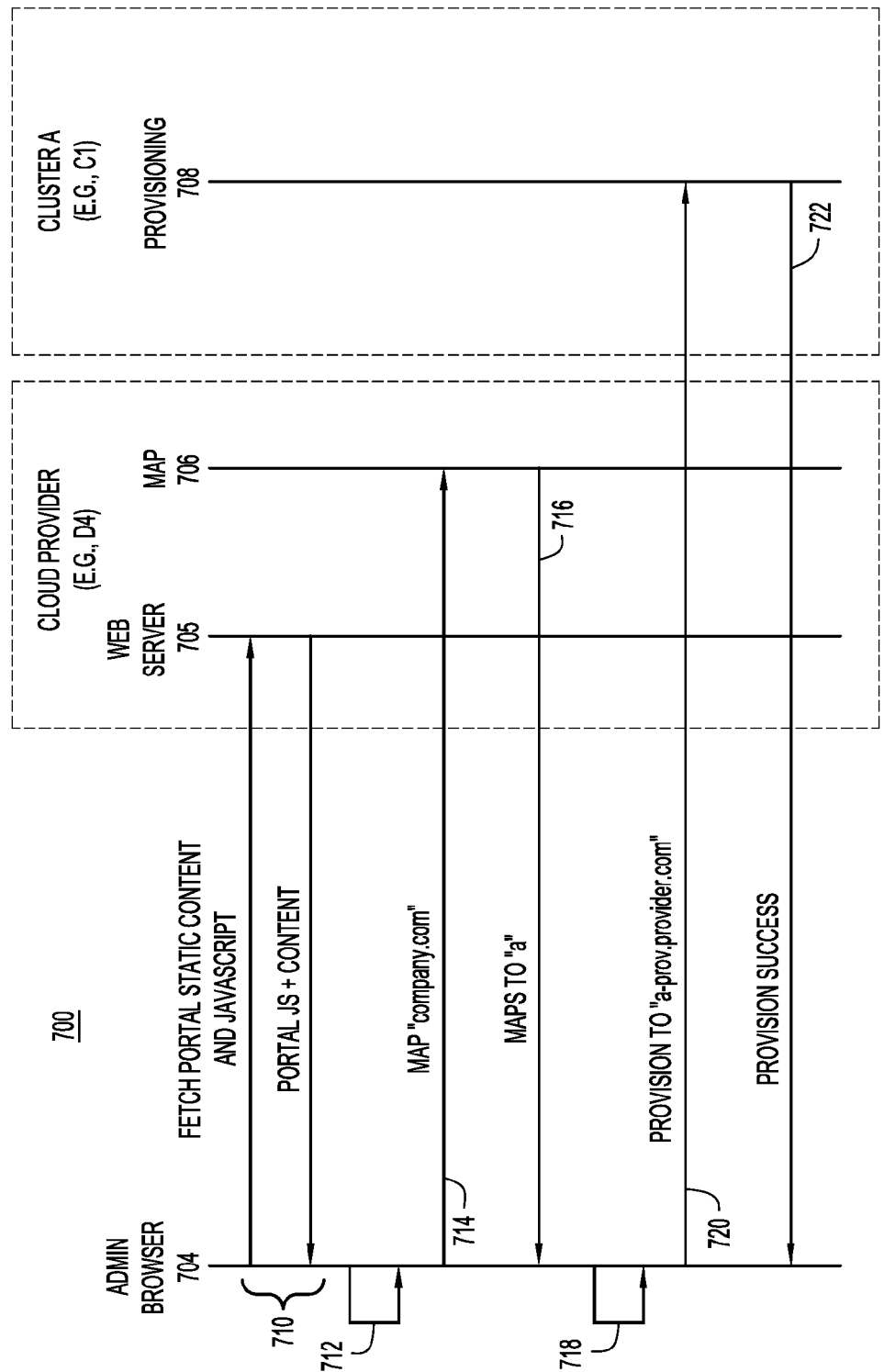
FIG. 7 is an illustration of message exchanges used to perform an example of a user provisioning operation on a cluster (also referred to as registering the user to or on the cluster), according to an example embodiment.

With reference to FIG. 7, there is illustration of message exchanges 700 used to perform an example of a provisioning operation as described above. In the example of FIG. 7, an admin browser 704 associated with a company data center 708 (e.g., data center D1 in FIG. 1) that hosts a cluster A (e.g., cluster C1 in FIG. 1) to be provisioned exchanges messages with a web server 705 and a domain-to-cluster map 706 of the cloud provider. At 710, admin browser 704 requests and receives the JavaScript and static content mentioned above. At 712, browser 704 examines the domain name part of the provisioned email address (e.g., "company.com") and, at 714, sends a query to domain-to-cluster map 706 to discover the name of the cluster handling the domain name ("company.com"). At 716, browser 704 receives "a" (the name of cluster a) from map 706 responsive to the query. At 718, browser 704 then constructs the URL for the provisioning service in cluster "a", which follows the convention "<clustername>-<service>.provider.com" as described above. The cloud provider portal had previously created DNS records for these services so that HTTP requests for this subdomain of the provider route into the private cloud in the customer data center. Furthermore, because these URLs are all subdomains of provider.com, the browser will utilize the OAuth token for the admin account, which will be also valid within the private cloud. At 720, browser 704 access a provisions service in cluster A of data center 708 based on the constructed URL to perform a requested provisioning operation on the cluster. At 722, after the provision operation succeeds, cluster A sends a success message to browser 704.

An important benefit of this process is that the provisioning operations of users are never seen by the cloud provider. They transact directly between the browser and the provisioning service within the customer premise. This ensures that, from a data sovereignty perspective, it is not possible for the cloud provider to know what users have been provisioned, since those requests do not pass through the cloud provider data center. The alternative embodiment does not hide provisioning operations from the cloud provider, but does not store any persistent information about provisioned users in the cloud provider clusters.

Cluster Software Elements

Figure 8:
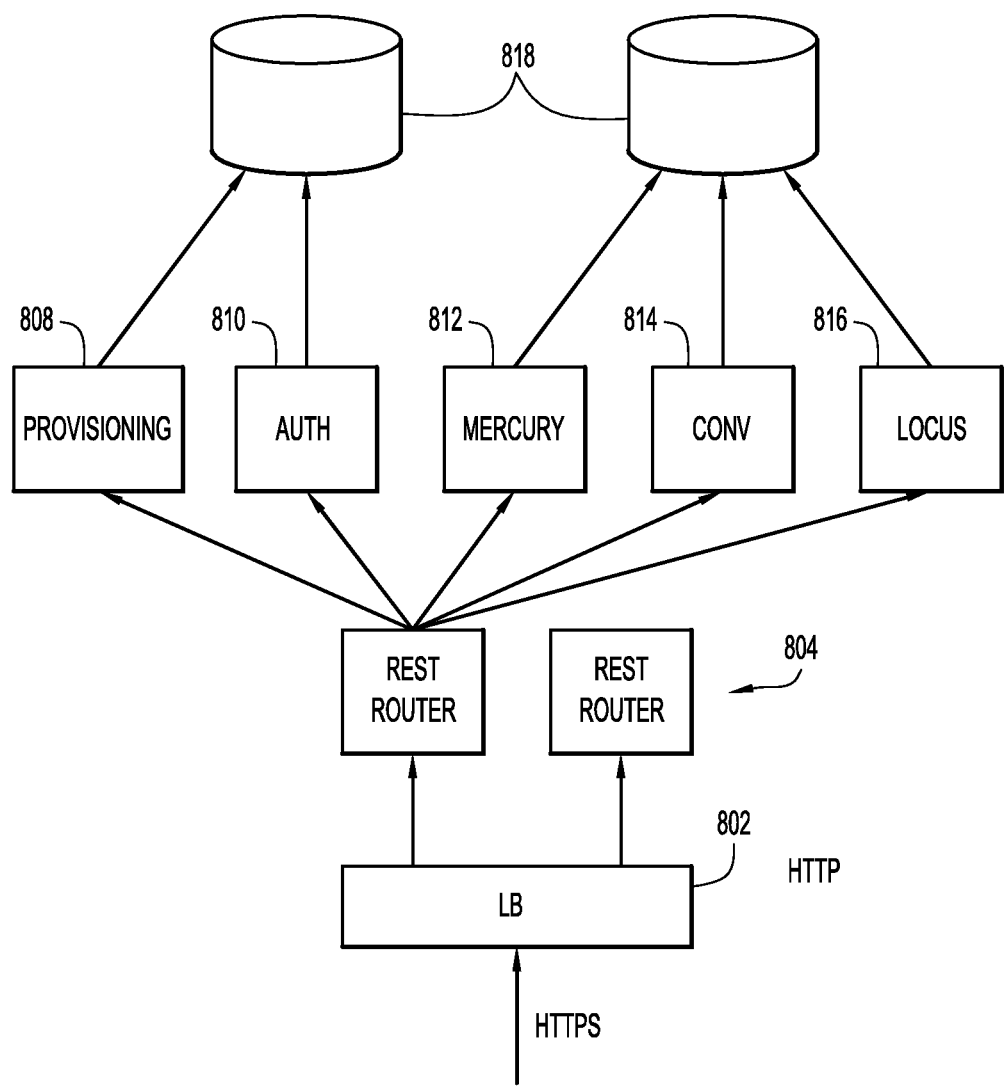
FIG. 8 is an illustration of example software components within a cluster implemented in a three-tier web architecture.

With reference to FIG. 8, there is an illustration of example software components within a cluster implemented in a three-tier web architecture. The software components include:
 a. A load balancer 802, which performs Transport Layer Security (TLS) termination;
 b. A reverse HTTP proxy 804, also known as a REST router;
 c. A set of HTTP applications 806 which sit behind the REST router, which include:
 d. A provisioning service 808, which is used to provision users and add user profile information;
 e. An authentication and authorization service 810;
 f. A notification service 812, which we call mercury, which handles asynchronous notification and message delivery to end user clients on mobile phones, desktop and browser apps;
 g. A persistent chat service 814, which we call conversation, which handles IM and related services;
 h. A call and conferencing service 816, which we call locus; and
 i. Databases 818 which are accessed by the HTTP applications 806.

Partitioning Model

Some of the HTTP application services that are utilized are not communications applications. An example of this is provisioning. The provisioning service provisions a single user. As such, the act of provisioning a user involves discovering the cluster for the user who is to be provisioned, and then directing the HTTP request there. This same basic pattern applies to other REST operations which involve a single user. Another example would be, a user updating a profile picture of the user.

Solutions presented herein enable users to communicate with each other when they reside in different clusters. To enable this, the solutions make use of a partitioning model which follows a common design pattern. This pattern applies to each of the HTTP services/applications which provide communications. These include locus, mercury, and conversation, depicted in FIG. 8.

Figure 10:
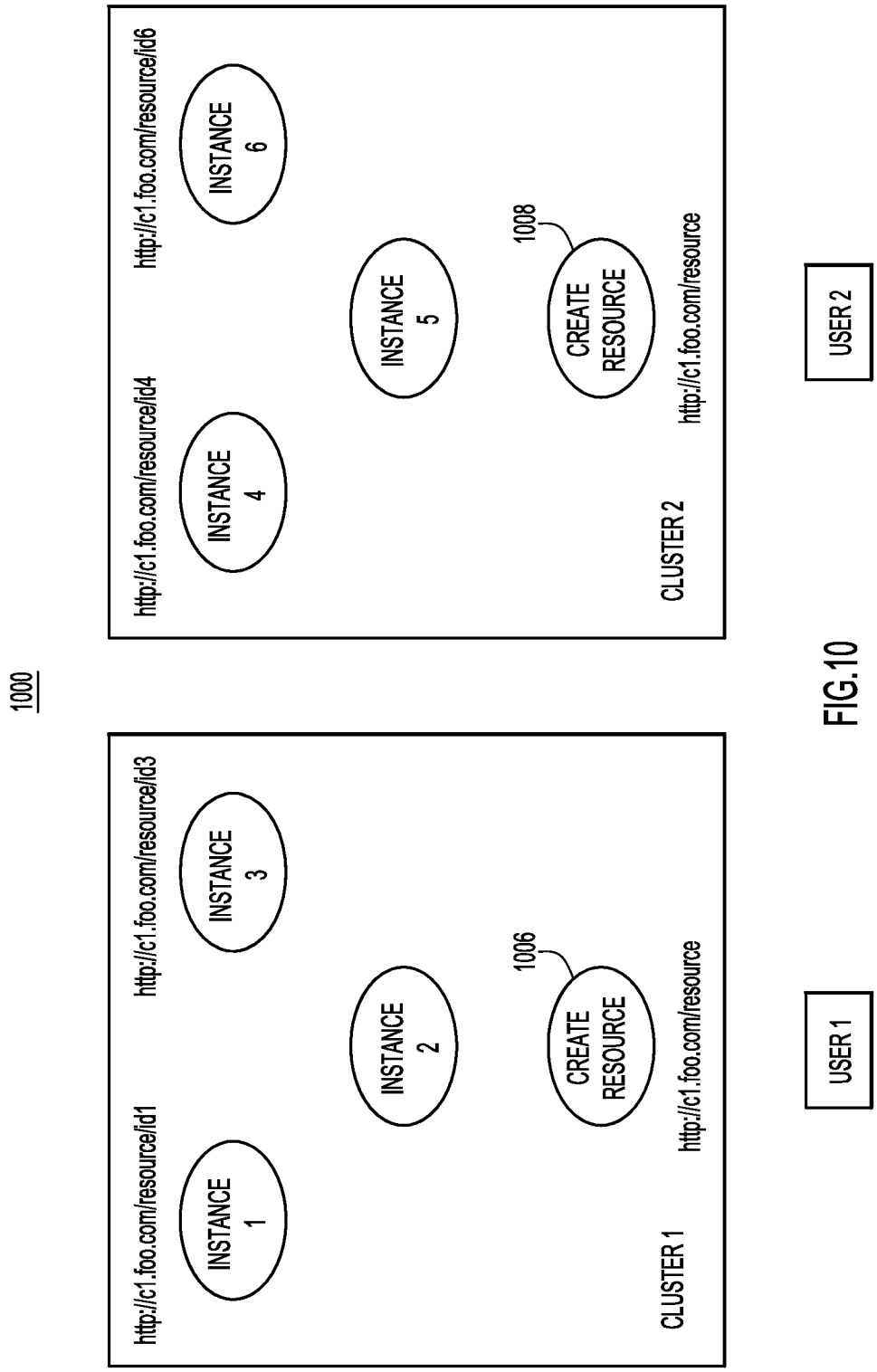
FIG. 10 is a pictorial representation of an example design pattern that enables users provisioned on different clusters to use services that communicate across the clusters, according to an example embodiment.

With reference to FIG. 10, there is a pictorial representation of an example design pattern 1000 that enables users provisioned on different clusters "Cluster 1" and "Cluster 2" to use services that communicate across the clusters. Each of these services (e.g., locus, mercury, and conversation) models communications as occurring through an "object," which is a RESTful resource that implements the service. In FIG. 10, each RESTful resource is referenced as a generic "resource," where the resource may be a call, or a conversation, or a meeting, or other communications events. This resource is created (e.g., at 1006 in Cluster 1 and 1008 in Cluster 2) by the user that wishes to communicate. This creation process happens by invoking a REST endpoint that provides the creation service. A user always creates the resource within the cluster in which the user is provisioned and thus served.

According to the representation depicted in FIG. 10, user 1 would create the resource by accessing the creation service in user 1's own cluster, Cluster 1. User 2 would access the creation resource in its own cluster, Cluster 2. As such, the creation resource exists in all clusters. However, once a specific resource is created—a call or a chat conversation—that represents a specific "instance" of the resource, this resource always exists/executes solely in the cluster in which the resource was created. As such, the HTTP URL representing that resource instance includes, in its domain name, the cluster in which the resource exists, along with the unique identifier for the resource. In the example of FIG. 10, three of the resource instances (instances 1, 2, and 3) exist in Cluster 1, and three of the instances (instances 4, 5, and 6) exist in Cluster 2. Once each resource instance is created, the user that created the instance can add users to the instance, representing the users that communications should take place with—whether it is a call or a chat, for example. These users are identified by email address. The resource instance then, acting like a client, accesses services in the cluster of those users, reaching them by mapping their email addresses into a cluster name and accessing resources there; however, the communications session is never split across two resources, the session always exists in one place. Resources accessed in the clusters of the other users are used strictly for messaging routing and bootstrapping to direct them back to the one resource instance where the communications session exists.

This pattern is best understood with specific embodiments for the communications services we have built.

Notification Services: Mercury

A key primitive operation is the ability to asynchronously send information to a user. Examples of where this may be needed are to deliver an instant message to a user, or to place a call to a user, or to acknowledge receipt of a message. For mobile clients, asynchronous information can also be sent using smartphone notification services, examples being Apple's Push Notification Service (APNS) and Google's Cloud Messaging (GCM).

Figure 9:
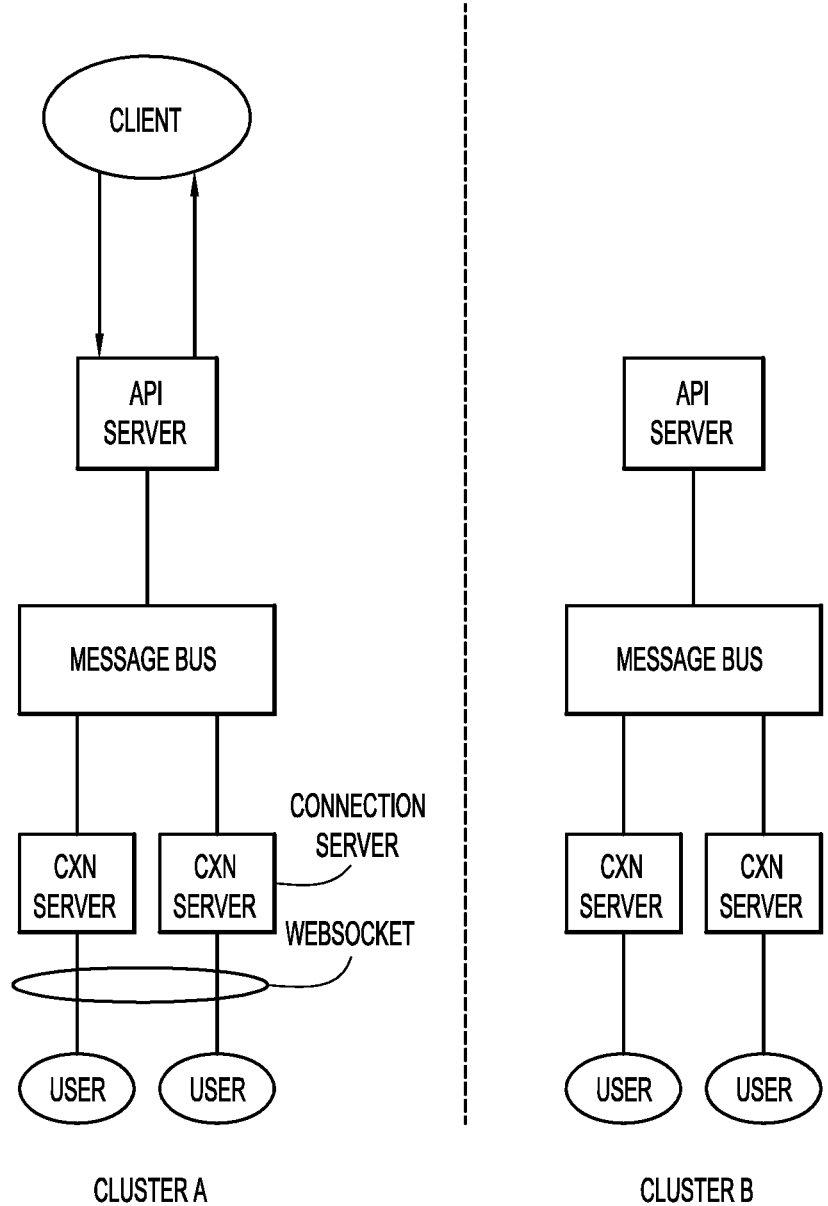
FIG. 9 is an example Mercury architecture as implemented in a multi-cluster model, according to an example embodiment.

These notifications are handled by Mercury. With reference to FIG. 9, there is depicted an example Mercury architecture 900 as implemented in the multi-cluster model.

At the bottom of FIG. 9, users represent end-user client applications, such as an application on a smartphone, or a web browser client, or a desktop application. These applications render the end user UX for the communications service.

In operation, the user software/application will establish a Websocket connection to a connection server in its own cluster (e.g., Cluster A or B). The user discovers its own cluster during the login process, as the login process starts with the email address which can be used to map to a cluster. As discussed previously, starting with the email address the user software can find the connection server in its own cluster.

The user software connects to its connection server, and through the websocket connection, authenticates and requests a notification Uniform Resource Identifier (URI). This notification URI can be used by any other application to send asynchronous messages to the user software, over this websocket connection. That request is sent from the connection server, to the API server over a message bus. The API server constructs a URL representing notification service for this device. This URI is of the form http://cluster-name-mercury.cloudprovider.com/notifications/<userID>. The API server knows the cluster in which the server resides and as such populates that cluster name (e.g., Cluster A or B) into the URL. This URL now will properly route to one of the API servers in the cluster for this user. As such, any piece of software resolving this URL will get routed to the right place.

This URL is returned from the API server, to the connection server, to the client. The client now remembers this URI and can register it, along with its APNS and or GCM URIs, with a separate registry service (not shown).

Conversation Service

Let us now consider a communications service, conversation. This is a chat service. It consists of "chat rooms", which are created as needed. We have a specific constraint however that, for 1-1 chats, there is just a single conversation between them. This emulates current behavior in most IM and mobile chat apps.

A conversation service can be thought of as having three REST endpoints, shown below:

| REST Endpoint | Exists | Meaning |
| --- | --- | --- |
| Conversations/ | In each cluster | The creation or construction resource. It is used to create conversations. |
| Conversations/<convID> | In the cluster in which the conversation was created | A specific conversation object, which will hold the messages sent into this conversation. |
| Conversations/users/<userID> | In the cluster in which the user lives | For each user, a list of the most recent conversations that have had activity. POST is used to add content; GET is used to retrieve the list. The GET is used by the client to populate the conversation list when the conversation starts. |
| Conversations/users/<userID>/<participant> | In the cluster in which the user lives | For each pair of users, there is one and only one conversation between them. This resource is populated to point to that conversation instance. |

Figure 13:
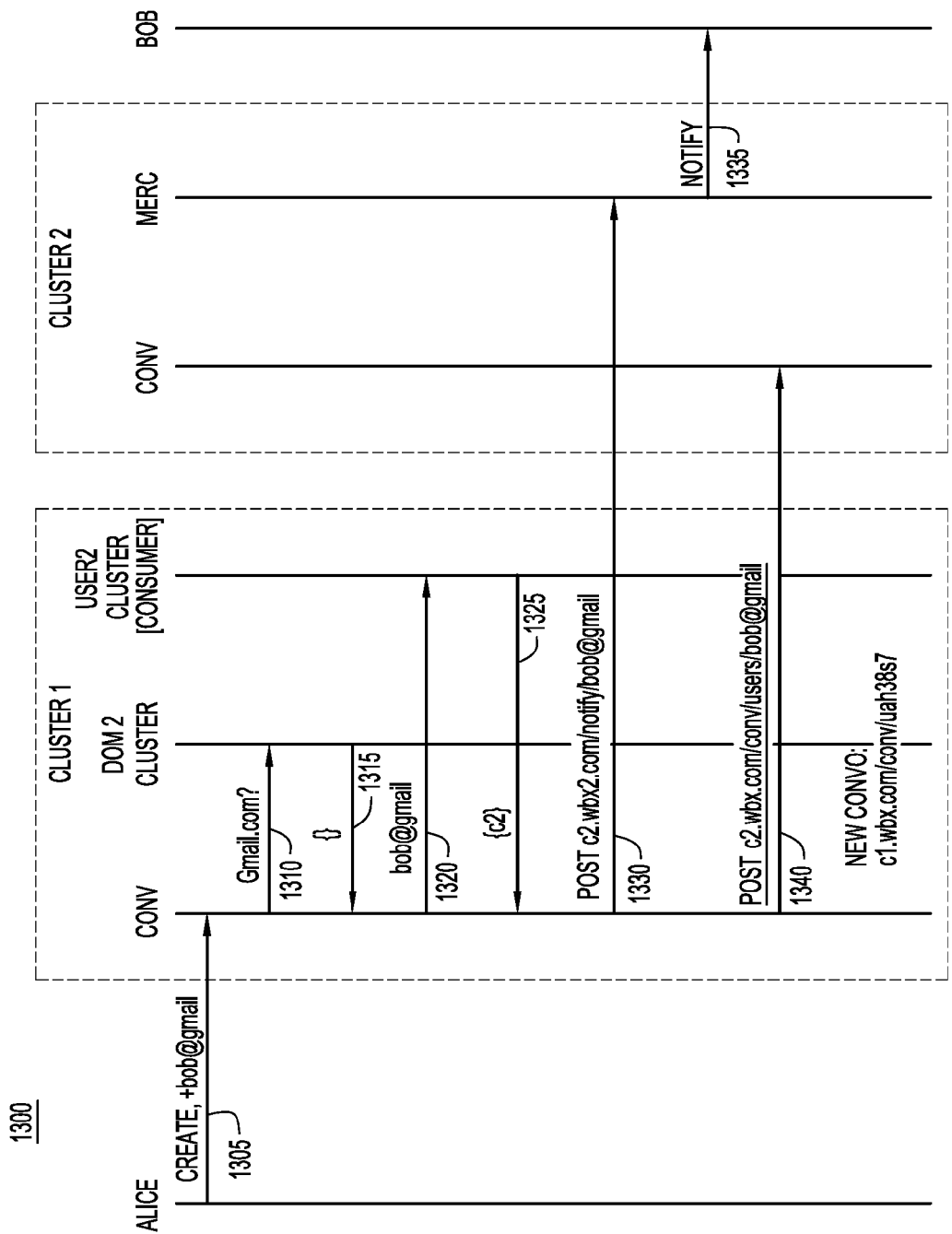
FIG. 13 is a diagram of example message exchanges used to setup a chat session between users provisioned on different clusters, according to an example embodiment.

With reference to FIG. 13, there is a diagram of example message exchanges 1300 used to setup a chat session between users provisioned on different clusters, e.g., user Alice in a cluster 1 who wishes to have a chat session with user Bob provisioned on a cluster 2.

First, at 1305, Alice will create the conversation/chat session with Bob. To do this, Alice invokes the creation resource in cluster 1, creating the conversation with Bob. Because this creation operation occurs in Alice's cluster 1, the conversation instance exists now in Alice's cluster 1. As part of the creation process, Alice will also specify the invitee as Bob, Bob@Gmail.com.

When the conversation service in cluster 1 receives the request to create the conversation, the service performs a few operations. First, the service creates the conversation instance object "Conv" (also revered to as a "client rendezvous protocol object") and stores it in the database.

Next, the service recognizes that the other participant in the conversation is Bob@Gmail.com. The service needs to first notify Bob of this new conversation. To do that, the service needs to access the Mercury service for Bob and, to do this, the service first needs to discover Bob's cluster. In the manner described above, at 1310, the service queries the local domain-to-cluster mapping service/map "Dom2 Cluster" and discovers, at 1315, that "Gmail.com" is not owned by any cluster (in an embodiment, the service may recognize known public domains like Gmail.com and Yahoo.com so as to avoid this step entirely).

At 1320, the service then queries the user-to-cluster mapping service/map "User2 Cluster [Consumer] for the consumer org, and discovers, at 1325, that Bob is in cluster 2.

Now the service needs to notify Bob of the existence of the conversation instance object "Conv" in cluster 1. To do this, the service then constructs the URI to access the mercury service for cluster 2—http://c2-mercury.wbx2.com/notifications/Bob@Gmail.com. At 1330, the service POSTS to this URL to request delivery of a notification, and the notification is routed to the mercury service in cluster 2, which knows of user Bob through the prior registration process. At 1335, the notification is delivered to Bob.

In Bob's cluster 2, there exists a resource conversations/users/Bob "Conv'" (also referred to as an "index protocol object") which keeps track of the conversations in which Bob is a participant (which may include maintaining pointers back to conversation instance objects, such as Conv, in other clusters), and what the most recent few messages are for each of those. This resource (the index protocol object Conv' in cluster 2) must now be updated by Alice's conversation service, to indicate this new conversation now exists (i.e., a pointer back to Conv in cluster 1 must be added to the index protocol object in cluster 2). To support that, at 1340, the conversation service in cluster 1 does a POST to the conversation service in cluster 2, adding an event for the creation of a new conversation.

When Bob receives the notification at 1335, he can launch his smartphone app. The app will query the conversation service in his cluster 2, asking the cluster to return all recent conversation events. He does that by performing a GET to c2.wbx2.com/conv/users/Bob@Gmail, which returns an object that indicates the recent events since last timestamp. In this case, the returned events indicate creation of a new conversation and includes in the JSON response the URL reference to the actual conversation in cluster 1—c1.wbx2.com/conv/uah387.

Now if Bob wants to send a message to Alice, he does so by POSTing directly to this conversation object—in cluster 1. Furthermore, if Bob wants to fetch older messages in this conversation, or add another user, or upload a file, all of those operations happen against the actual conversation instance in cluster 1. The conversation user resource Conv' exists in cluster 2, but Conv' serves primarily as a reference to allow Bob to know—across all of the other clusters—the conversations he is a member of, and which ones have recent activity. This conversation user resource Conv' also allows Bob's smartphone app to quickly show to him the most recent few messages across all conversations that he is a member of, without having to directly query each cluster to find out.

The conversation server in cluster 2 will also locally update c2.wbx2.com/conv/users/Bob@Gmail/Alice@foo, and that resource—which identifies the conversation between Bob and Alice—references c1.wbx2.com/conv/uah387. Similarly, the conversation server in cluster 1 will update c1.wbx2.com/conv/users/Alice@foo/Bob@Gmail and point to the same URL—c1.wbx2.com/conv/uah387.

There is a race condition here, of course, if Alice and Bob should try to chat with each other for the first time at the same instance, we will create two conversation objects in two different clusters. In such a case, the one that is "lower" will win (based on some kind of hash or timestamp or anything that provides a unique ordering. This is a cleanup operation after the fact.

In a similar way, the conversation servers in clusters 1 and 2 will maintain search indexes for the conversation. However, only the index in cluster 1 is truly complete since the index will have/indicate all messages since the beginning of this conversation; if messages are sent and then much later another person is added to the conversation, the index in the cluster of the new user will be incomplete. This requires a multi-step search process which will necessarily result in the slowest search results when a user queries history for a conversation he was recently added to, for which that conversation exists in a different cluster.

Calling

Calling works in much the same way as conversations, described above. There is a "call" object, which we call the locus. Like conversation, there is a resource for construction of a call which lives in every cluster, and the resource for each specific call lives only in a single cluster. This is true for both 1-1 calls and group calls. In that sense, this architecture is what is often referred to as a "full call model" in the literature. The trick is to create an index in the cluster of the other user to allow these calls to be found and manipulated.

The REST endpoints for calls look much like their conversation counterparts:

| REST Endpoint | Exists | Meaning |
| --- | --- | --- |
| loci/ | In each cluster | The creation or construction resource. It is used to create locuses (aka loci aka calls) |
| Loci/<lid> | In the cluster in which the locus was created | A specific locus, which will hold the state of the call for all participants (active, inactive, ringing, etc.) |
| Loci/users/<userID> | In the cluster in which the user lives | For each user, a list of the active loci for this user. This REST endpoint receives a POST to update it with active loci from other clusters. The user will GET against this resource to find the calls they are in. |

We described above the race condition that can exist when two users create a conversation with each other at the same time. This same race condition is possible for calls. However, in the case of calls the race condition is far more likely, and furthermore, the race condition must be resolved very quickly. To address this problem, we utilize a concept we call the persistent locus. The idea is that, once a conversation between a pair of users is created (establishing only a single conversation object between any pair of users), there is also allocated a single locus. The way to think about this, is that for each pair of users we basically have a persistent conference bridge that is created and unique for the pair. When user A wants to call user B, what they are really doing is "joining the bridge", and then asking the other user to join the same bridge. Consequently, this "bridge" model allows us to provide a user experience which is identical to the well understood calling experience. Yet, the bridge model works well for inter-cluster cases because there is a single source of truth for call state and a single rendezvous point—a singular REST endpoint—where both participants access. This means race conditions are resolved much quicker, within the timespan of local DB replication within a single data center.

This persistent locus object is created at the time the conversation itself is created. The locus URL thus exists in the same cluster as where the conversation itself was created.

Figure 14:
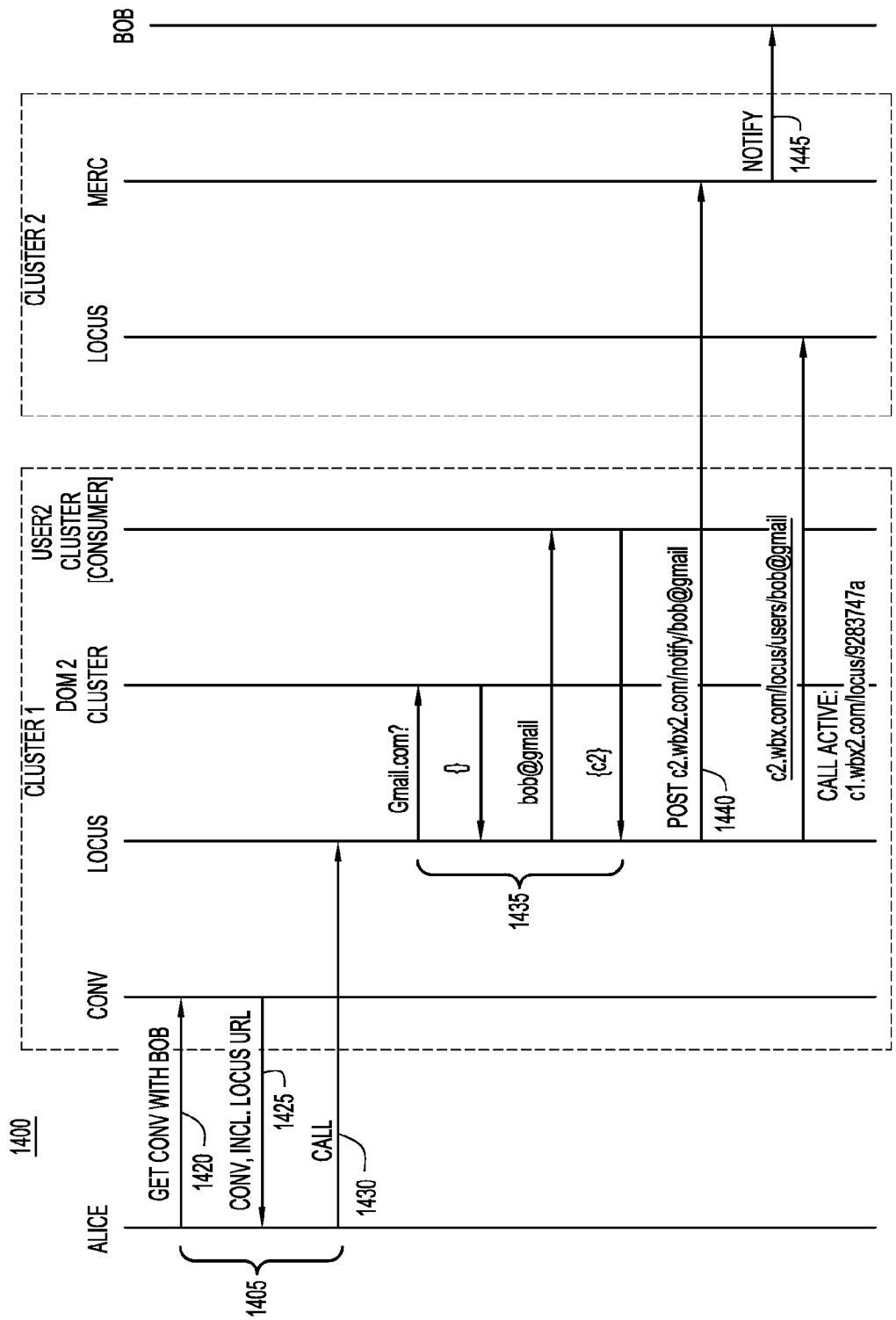
FIG. 14 is a diagram of example message exchanges when a user provisioned on a first cluster wants to call a user provisioned on second cluster, using a locus technique, according to an example embodiment.

With reference to FIG. 14, there is a diagram of example message exchanges 1400 when user Alice provisioned on cluster 1 wants to call user Bob provisioned on cluster 2, using the above-mentioned locus technique.

At 1405 generally, user Alice initiates the call in the following manner. User Alice may select Bob from a contact list available on an application ("app") on Alice's smartphone, for example. Alice clicks "call" from the app. The app will query her local conversation service (Conv), to find the existing 1-1 conversation with Bob. This uses the REST endpoint c1.wbx2.com/conv/users/Alice@foo/Bob@Gmail. As described above this query returns a pointer to their joint conversation, which also lives in cluster 1: c1.wbx2.com/conv/uah387.

General operation 1405 includes operations 1420 and 1425. At 1420, Alice's client will connect to that conversation service instance Conv, and query Conv for state. At 1425, the state is returned to Alice's client. This state will include the URL of the locus instance ("Locus") for the two users, which is c1.wbx2.com/locus/9283747a. Note how this resource also lives in cluster 1; this is because this locus instance was created by the conversation server in cluster 1 when this conversation was first created.

Now, Alice has the URL of the locus. At 1430, Alice invokes the locus, asking the locus to activate and thus call Bob. The locus instance in cluster 1 knows that Bob is the other participant. At 1435, the locus then follows a process identical to the conversation server flow above to discover Bob's cluster (i.e., actions 1310-1325). At 1440 and 1445, the locus finds Bob's cluster, creates the URL to notify him of the call, sends the POST to the URL, and creates the URL to update Bob's user object to indicate that this locus is now active. A result of the POST is the notify to Bob at 1445.

Bob's phone rings when he receives the notify. The notification payload will contain the locus URL. If Bob ignores the notification on his smartphone and just launches his communications app anyway, the app will start up. One of the first things the app does is to query c2.wbx2.com/locus/users/Bob@Gmail and retrieve its list of active loci. In this case, the one locus c1.wbx2.com/conv/uah387 is listed. Bob can then query this locus resource, find the state of this call (in this case its state is "alerting Bob") which causes Bob's phone to show a ringing dialog. Bob presses answer. This causes his client to again POST to c1.wbx2.com/conv/uah387, and updates the state to active. Alice and Bob are now talking, having rendezvoused through this locus/call object in cluster 1.

When the call ends, the locus instance in cluster 1 will POST to the user resource in cluster 2, updating the user resource in cluster 2 to indicate that this call is now inactive.

Method Flowcharts

FIGS. 15-18 are flowcharts of operations that summarize various stack fusion techniques described above.

Figure 15:
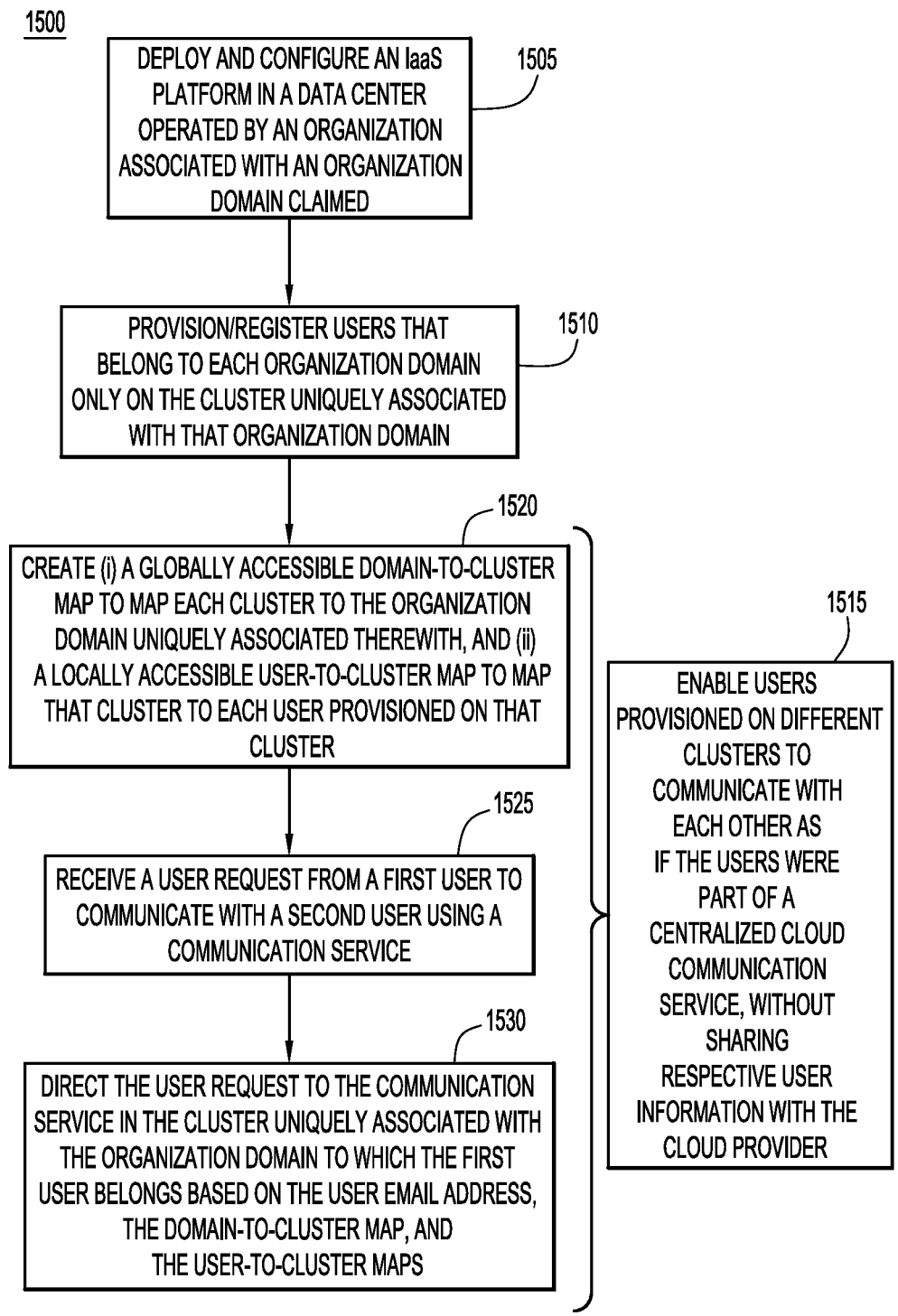
FIG. 15, there is a flowchart of an example method of establishing an architecture for distributed communication services, according to an example embodiment.

With reference to FIG. 15, there is a flowchart of an example method 1500 of establishing a stack fusion architecture for distributed communication services that enables communications between users, according to an embodiment. A cloud provider provides SaaS offerings to multiple organizations based on the architecture/services established in method 1500.

At 1505, an IaaS platform including compute, storage, and network resources is deployed and configured in each of multiple data centers. Each data center is operated by a corresponding organization associated with an organization domain claimed by that organization.

At 1510, users that belong to each organization domain are provisioned/registered only on the cluster uniquely associated with that organization domain.

At high-level operation 1515, users provisioned on different clusters are enabled to communicate with each other as if the users were part of a centralized cloud communication service, without sharing respective user information with the cloud provider, e.g., without exposing user identities or private user information stored on a give cluster with the cloud provider. High-level operation 1515 includes further operations 1520-1530, described below.

At 1520, a globally accessible domain-to-cluster map is created to map each cluster to the organization domain uniquely associated therewith. Also, a locally accessible user-to-cluster map to map a given cluster to each user provisioned on that cluster is stored in that cluster.

At 1525, a user request from a first user to communicate with a second user using a communication service is received.

At 1525, the user request is directed to the communication service in the cluster uniquely associated with the organization domain to which the first user belongs based on the user email address, the domain-to-cluster map, and the user-to-cluster maps.

Figure 16:
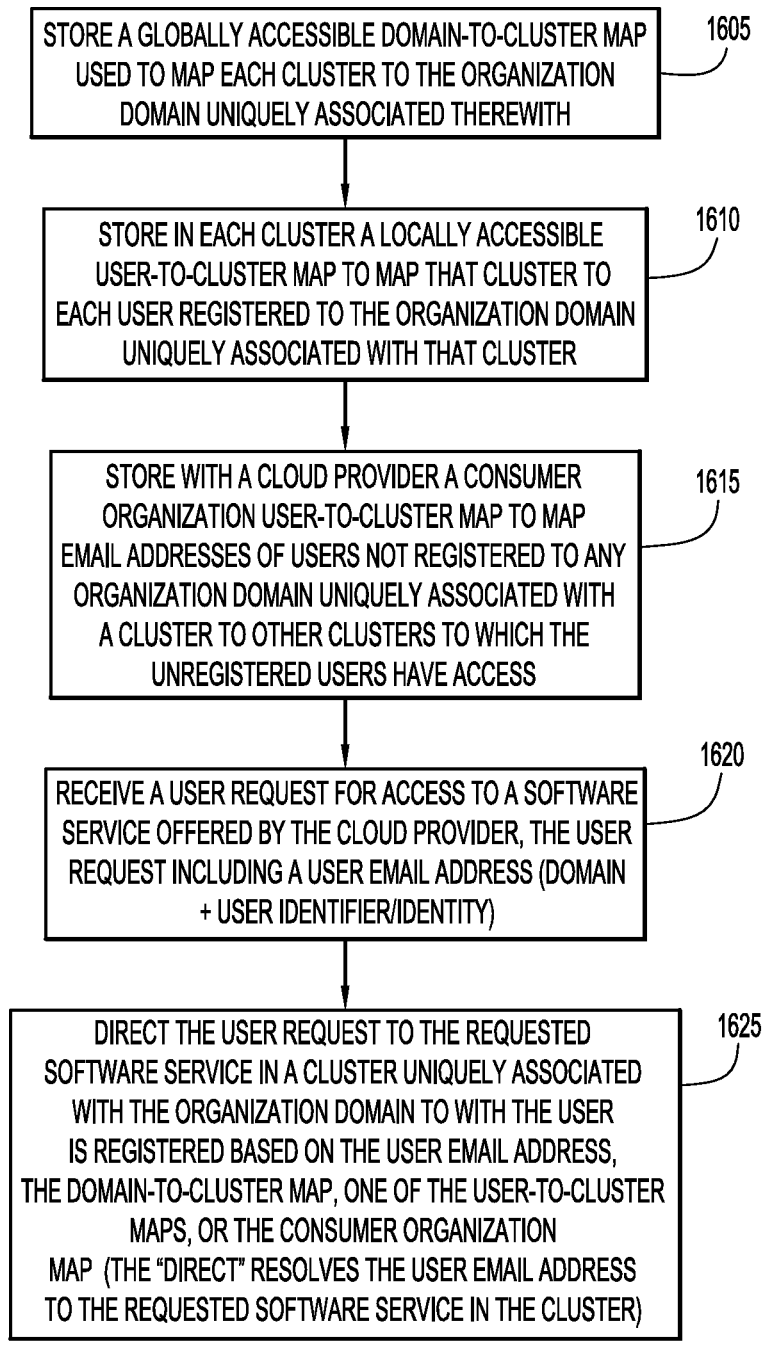
FIG. 16 is a flowchart of an example method of user and cluster-related mapping operations performed in the architecture for distributed communication services established in the method of FIG. 15, according to an example embodiment.

With reference to FIG. 16, there is a flowchart of an example method 1600 of user and cluster-related mapping operations performed in the stack fusion architecture for distributed communication services established in method 1500, according to an embodiment.

At 1605, a globally accessible domain-to-cluster map used to map each cluster to the organization domain uniquely associated therewith is stored in the architecture established in method 1500.

At 1610, a locally accessible user-to-cluster map is stored in each cluster to map that cluster to each user registered to the organization domain uniquely associated with that cluster.

At 1615, a consumer organization user-to-cluster map is stored with the cloud provider to map email addresses of users not registered to any organization domain uniquely associated with a cluster to other clusters to which the unregistered users have access.

At 1620, a user request is received for access to a software service (e.g., communication service) offered by the cloud provider, the user request including a user email address (which includes an organization domain and a user identifier/identity).

At 1625, the user request is directed to the requested software service in a cluster uniquely associated with the organization domain to with the user is registered based on the user email address, the domain-to-cluster map, one of the user-to-cluster maps, or the consumer organization map (the "direct" resolves the user email address to the requested software service in the cluster).

With reference to FIG. 17, there is a flowchart of "directing" operation 1625 from method 1600, according to an embodiment.

At 1705, the globally accessible domain-to-cluster map is searched for an organization domain that matches a domain of the user email address.

At 1710, if the search in 1705 finds an organization domain that matches the domain of the user email address, an address is constructed for the requested software service based on the cluster mapped to the found organization domain, which vectors the search to that cluster (go to next operation 1715).

At 1715, the locally accessible user-to-cluster map in the mapped cluster for the user identifier is searched, and if the user identifier is found in the locally accessible user-to-cluster map, the requested software services on that cluster is accessed.

At 1720, if the search of the globally accessible domain-to-cluster map at 1705 does not find an organization domain therein that matches the domain of the user email address, the consumer organization user-to-cluster map is searched for a cluster that is mapped to the user email address.

At 1725, if the search of the consumer organization user-to-cluster map at 1720 finds a cluster mapped to the user email address, an address is constructed for the requested software service based on the cluster mapped to the user email address, which vectors access to the service in the cluster.

At 1730, the requested software service in the cluster mapped to the user email address based on the constructed address (from 1725) is accessed.

Figure 18:
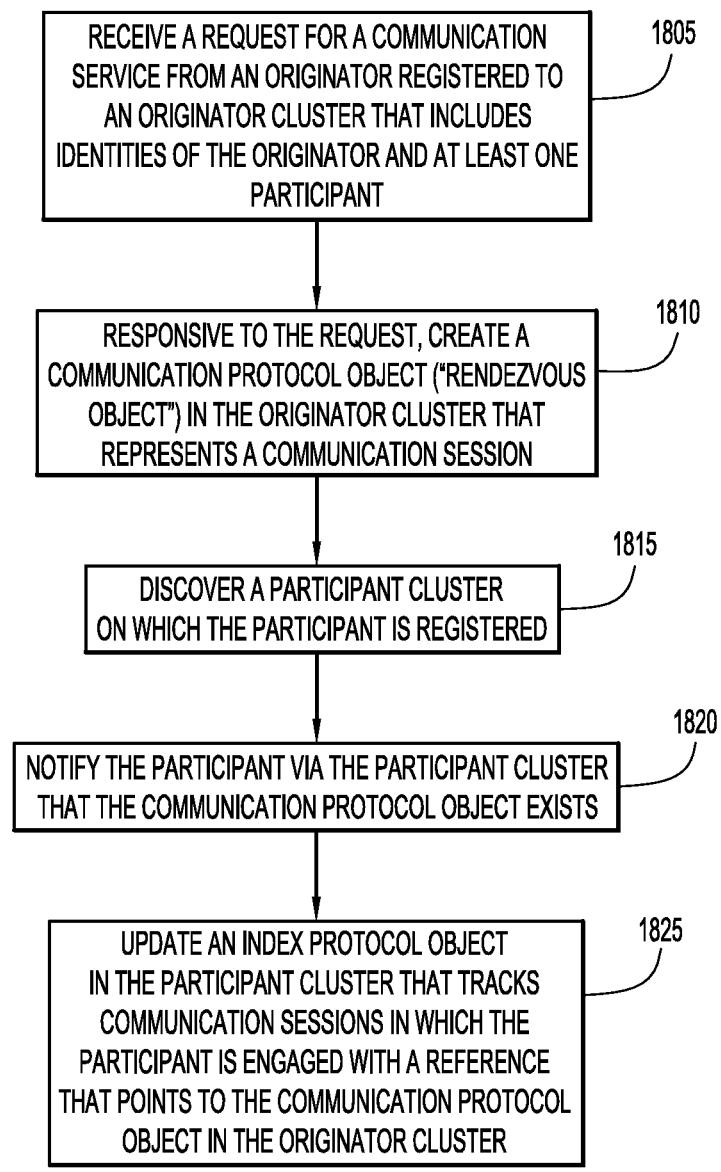
FIG. 18 is a flowchart of an example method of communicating in a distributed communication services system.

With reference to FIG. 18, there is a flowchart of an example method 1800 of communicating in a distributed communication services system as established in method 1500. Method 1800 corresponds to the message diagram of FIG. 14.

At 1805, a request for a communication service is received from an originator registered to an originator cluster that includes identities of the originator and at least one participant.

At 1810, responsive to the request, a communication protocol object ("rendezvous protocol object") is created in the originator cluster that represents a communication session.

At 1815, a participant cluster on which the participant is registered is discovered.

At 1820, the participant is notified via the participant cluster that the communication protocol object exists.

At 1825, an index protocol object in the participant cluster that tracks communication sessions in which the participant is engaged is updated with a reference that points to the communication protocol object in the originator cluster. A POST may be used to perform the update.

Generalized Device Controller

Figure 19:
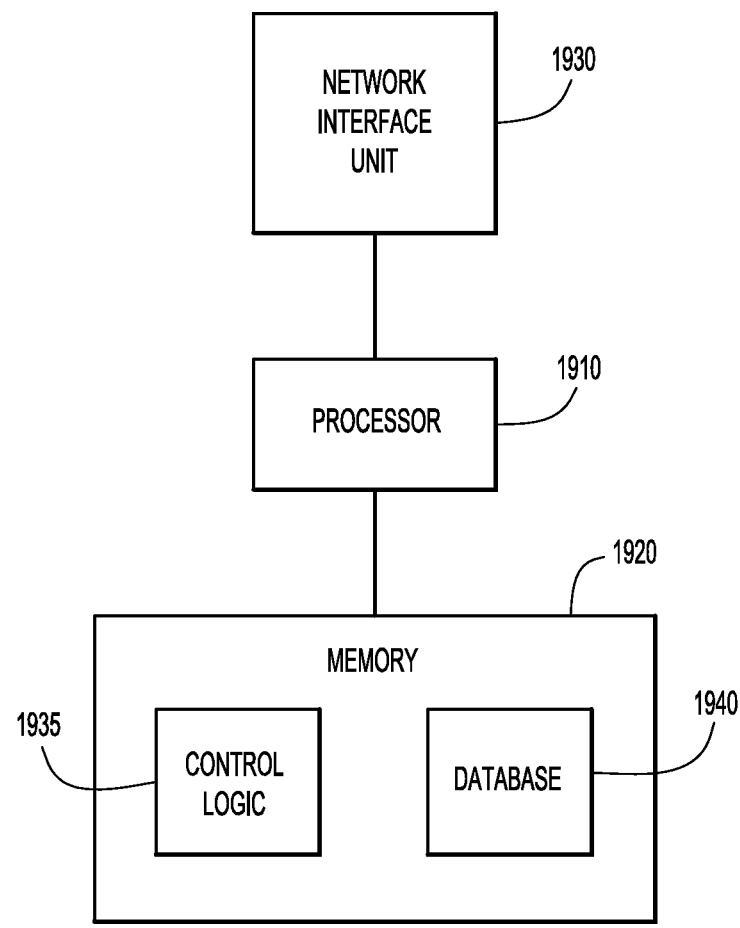
FIG. 19 is a block diagram of an example generalized controller used in a data center to execute cluster applications deployed on a platform.

With reference to FIG. 19, there is depicted a block diagram of an example generalized controller 1900 for an IaaS platform (e.g., any of platforms P1-P4 in FIG. 1) used in a data center to execute cluster applications and Ops tools, and the like. Thus, controller 1900 is an example of compute, storage, and network resources for the IaaS platform.

Controller 1900 includes a processor 1910 that processes instructions to perform operations for a given IaaS platform; and a memory 1920 to store a variety of data and software instructions for execution by the processor 1910. Controller 1900 also includes a network interface unit (e.g., network interface card or multiple network interface cards) 1930 that enables network communications so that the controller can communicate with other devices. Memory 1920 may comprise read only memory (ROM), random access memory (RAM), magnetic disk storage media devices, optical storage media devices, flash memory devices, electrical, optical, or other physical/tangible (e.g., non-transitory) memory storage devices. The processor 1910 is, for example, a microprocessor or microcontroller that executes instructions for implementing the processes described herein. Thus, in general, the memory 1920 may comprise one or more tangible (non-transitory) computer readable storage media (e.g., a memory device) encoded with software (e.g., control logic/software 1935) comprising computer executable instructions and when the software is executed (by the processor 1910) it is operable to perform the operations described herein, e.g., to implement the stack fusion processes, methods, and messages exchanges represented at 300, 500, 600, 700, 900, and 1300-1800. In addition, memory 1920 includes a data store or database 1940 to store data used and generated by logic 1935.

In one form, a method is provided comprising: in a system in which a cloud provider is configured to provide Software-as-a-Service (SaaS) offerings to multiple organizations, each organization to operate a distinct Infrastructure-as-a-Service (IaaS) platform and being associated with at least one distinct organization domain associated with the organization: deploying to each IaaS platform a cluster of software services, including communication services, operated by the cloud provider, each cluster being uniquely associated with the organization that operates that IaaS platform; deploying each IaaS platform to a data center, wherein each IaaS platform includes compute, storage, and network resources and an IaaS operating system; provisioning users that belong to each organization on the cluster associated with that organization, wherein the provisioning includes storing user information for each user only on the associated cluster; and enabling users provisioned on different clusters to communicate with each other as if the users were part of a centralized cloud communication service, without sharing respective user information with the cloud provider.

In another form, another method is provided comprising: establishing a distributed Software-as-a-Service (SaaS) system in which a cloud provider offers software services to multiple organizations, each organization to operate a distinct cluster of software services of the cloud provider, each cluster uniquely associated with an organization domain of the organization that operates the cluster, wherein users registered to a given organization domain have access limited to the cluster associated with that organization domain; storing a globally accessible domain-to-cluster map used to map each cluster to the organization domain uniquely associated therewith; storing in each cluster a locally accessible user-to-cluster map to map that cluster to each user registered to the organization domain associated with that cluster so as to have access thereto; receiving a user request for access to a software service offered by the cloud provider, the user request including a user email address; and directing the user request to the requested software service in a cluster uniquely associated with the organization domain to with the user is registered based on the user email address, the domain-to-cluster map, and one of the user-to-cluster maps.

In yet another form, a system is provided comprising: multiple infrastructure-as-a-Service (IaaS) platforms each to be operated by a corresponding one of multiple organizations and being associated with at least one organization domain claimed by the organization that is to operate that IaaS platform; multiple clusters of software services, including communication services, deployed on corresponding ones of the IaaS platforms and being uniquely associated with the organization domain corresponding to the organization that operates that IaaS platform on which the cluster is deployed, wherein the software services include offerings from a cloud provider; wherein each IaaS platform is deployed to a data center and includes compute, storage, and network resources and an IaaS operating system; wherein users that belong to each organization domain are provisioned only on the cluster uniquely associated with that organization domain, such that user information for each user is stored only on the associated cluster; and wherein users provisioned on different clusters are enabled to communicate with each other as if the users were part of a centralized cloud communication service, and without sharing respective user information with the cloud provider.

In yet another form, a method is provided comprising: at an originator cluster of software services, including communication services, in a distributed Software-as-a-Service (SaaS) system including multiple clusters each associated with an organization that operates that cluster, wherein participants registered to a given organization have access limited to the cluster uniquely associated with that organization: receiving a request for a communication service from an originator registered to the originator cluster that includes identities of the originator and at least one participant; responsive to the request, creating a communication protocol object in the originator cluster that represents a communication session; discovering a participant cluster on which the participant is registered; notifying the participant via the participant cluster that the communication protocol object exists; and updating an index protocol object in the participant cluster that tracks communication sessions in which the participant is engaged with a reference that points to the communication protocol object in the originator cluster.

In still another form, an apparatus is provided comprising: an originator platform, including compute resources, network resources, and storage resources, configured to host an originator cluster of software services, including communication services, in a distributed Software-as-a-Service (SaaS) system including multiple clusters each uniquely associated with an organization domain claimed by a corresponding organization that operates that cluster, wherein participants registered to a given organization domain have access limited to the cluster uniquely associated with that organization domain, the compute resources including a processor to: receive a request for a communication service from an originator registered to the originator cluster that includes identities of the originator and at least one participant; responsive to the request, create a communication protocol object in the originator cluster that represents a communication session; discover a participant cluster on which the participant is registered; notify the participant via the participant cluster that the communication protocol object exists; and update an index protocol object in the participant cluster that tracks communication sessions in which the participant is engaged with a reference that points to the communication protocol object in the originator cluster.

In an even further form, a tangible computer readable storage media is provided. The tangible computer readable storage media is encoded with instructions that, when executed by a processor on which a cluster of software services, including communication services, is deployed in a distributed Software-as-a-Service (SaaS) system including multiple clusters each associated with an organization domain corresponding to an organization that operates that cluster, wherein participants registered to a given organization domain have access limited to the cluster uniquely associated with that organization domain, cause the processor to: receive a request for a communication service from an originator registered to the originator cluster that includes identities of the originator and at least one participant; responsive to the request, create a communication protocol object in the originator cluster that represents a communication session; discover a participant cluster on which the participant is registered; notify the participant via the participant cluster that the communication protocol object exists; and update an index protocol object in the participant cluster that tracks communication sessions in which the participant is engaged with a reference that points to the communication protocol object in the originator cluster.

In an yet another form, one or more non-transitory computer readable storage mediums are provided. The one or more computer readable storage mediums are encoded with instructions that, when executed by one or more processors of a system in which a cloud provider is configured to provide Software-as-a-Service (SaaS) offerings to multiple organizations, each organization to operate a distinct Infrastructure-as-a-Service (IaaS) platform and being associated with at least one distinct organization domain associated with the organization, cause the one or more processors to: deploy to each IaaS platform a cluster of software services, including communication services, operated by the cloud provider, each cluster being uniquely associated with the organization that operates that IaaS platform; deploy each IaaS platform to a data center, wherein each IaaS platform includes compute, storage, and network resources and an IaaS operating system; provision users that belong to each organization on the cluster associated with that organization, wherein the provisioning includes storing user information for each user only on the associated cluster; and enable users provisioned on different clusters to communicate with each other as if the users were part of a centralized cloud communication service, without sharing respective user information with the cloud provider.

The above description is intended by way of example only. Various modifications and structural changes may be made therein without departing from the scope of the concepts described herein and within the scope and range of equivalents of the claims.

What is claimed is:

1. A method comprising:
   in a system in which a cloud provider is configured to provide Software-as-a-Service (SaaS) offerings to multiple organizations, each organization to operate a distinct Infrastructure-as-a-Service (IaaS) platform and being associated with at least one distinct organization domain associated with the organization:
   deploying to each IaaS platform a cluster of software services, including communication services, operated by the cloud provider, each cluster being uniquely associated with the organization that operates that IaaS platform;
   deploying to each cluster a provisioning service to perform provisioning of users, and one of the communication services to support communications between users provisioned in one cluster and between users provisioned on different clusters;
   deploying each IaaS platform to a data center, wherein each IaaS platform includes compute, storage, and network resources and an IaaS operating system;
   provisioning users that belong to each organization on the cluster associated with that organization, wherein the provisioning includes storing user information for each user only on the associated cluster; and
   enabling users provisioned on different clusters to communicate with each other as if the users were part of a centralized cloud communication service, without sharing respective user information with the cloud provider.

2. The method of claim 1, further comprising:
   configuring each IaaS platform remotely from the cloud provider via the IaaS operating system for that platform.

3. The method of claim 1, wherein the deploying to each cluster further includes deploying to each cluster an authentication and authorization service to authenticate and authorize only provisioned users to invoke the other services deployed to the cluster.

4. The method of claim 1, wherein the enabling includes:
creating a globally accessible domain-to-cluster map in order to map each cluster to the organization domain uniquely associated therewith; and
storing in each cluster a locally accessible user-to-cluster map in order to map that cluster to each user provisioned on that cluster.

5. The method of claim 4, wherein:
the provisioning users includes storing an email address for each user including an organization domain to which the user belongs and a user identifier; and
the enabling includes:
receiving a request to communicate with a user using a communication service, the request including a user email address of the user; and
directing the request to the communication service in the cluster uniquely associated with the organization domain to which the user belongs based on the user email address, the domain-to-cluster map, and one of the user-to-cluster maps.

6. The method of claim 1, wherein the provisioning of a given cluster with user information identifying a given user associated with an organization includes:
receiving a user email address for the user to be provisioned, the user email address including a user identifier and the organization domain corresponding to the organization;
searching a domain-to-cluster map stored with the cloud provider for the cluster associated with the organization domain in the email address;
if the associated cluster is found as a result of the searching, constructing an address of a provisioning service deployed on the associated cluster; and
invoking the provisioning service in the associated cluster to add the private user information thereto.

7. A system comprising:
multiple infrastructure-as-a-Service (IaaS) platforms each to be operated by a corresponding one of multiple organizations and being associated with at least one organization domain claimed by the organization that is to operate that IaaS platform;
multiple clusters of software services, including communication services, deployed on corresponding ones of the IaaS platforms and being uniquely associated with the organization domain corresponding to the organization that operates that IaaS platform on which the cluster is deployed, wherein the software services include offerings from a cloud provider;
wherein each IaaS platform is deployed to a data center and includes compute, storage, and network resources and an IaaS operating system;
wherein users that belong to each organization domain are provisioned only on the cluster uniquely associated with that organization domain, such that user information for each user is stored only on the associated cluster; and
wherein users provisioned on different clusters are enabled to communicate with each other as if the users were part of a centralized cloud communication service, and without sharing respective user information with the cloud provider, wherein the users provisioned on the different clusters are enabled to communicate by:
creating a globally accessible domain-to-cluster map to map each cluster to the organization domain uniquely associated therewith; and
storing in each cluster a locally accessible user-to-cluster map to map that cluster to each user provisioned on that cluster.

8. The system of claim 7, wherein each IaaS platform is configured remotely from the cloud provider via the IaaS operating system for that platform.

9. The system of claim 7, further comprising a provisioning service to perform the provisioning users deployed to each cluster, and a communication service is deployed to each cluster to support communications between users provisioned in one cluster and between users provisioned on different clusters.

10. The system of claim 9, further comprising an authentication and authorization service deployed to each cluster to authenticate and authorize only provisioned users to invoke the other services deployed to the cluster.

11. The system of claim 7, wherein:
the users are provisioned by storing an email address for each user including an organization domain to which the user belongs and a user identifier; and
the users provisioned on different clusters are enabled to communicate with each other by:
receiving a request to communicate with a user using a communication service, the request including an email address of the user; and
directing the request to the communication service in the cluster uniquely associated with the organization domain to which the user belongs based on the user email address, the domain-to-cluster map, and one of the user-to-cluster maps.

12. The system of claim 7, wherein a given cluster is provisioned with user information identifying a given user associated with an organization by:
receiving a user email address for the user to be provisioned, the user email address including a user identifier and the organization domain corresponding to the organization;
searching a domain-to-cluster map stored with the cloud provider for the cluster associated with the organization domain in the email address;
if the associated cluster is found as a result of the searching, constructing an address of a provisioning service deployed on the associated cluster; and
invoking the provisioning service in the associated cluster to add the private user information thereto.

13. One or more non-transitory computer readable storage mediums encoded with instructions that, when executed by one or more processors of a system in which a cloud provider is configured to provide Software-as-a-Service (SaaS) offerings to multiple organizations, each organization to operate a distinct Infrastructure-as-a-Service (IaaS) platform and being associated with at least one distinct organization domain associated with the organization, the instructions configured to cause the one or more processors to:
deploy to each IaaS platform a cluster of software services, including communication services, operated by the cloud provider, each cluster being uniquely associated with the organization that operates that IaaS platform;
deploy to each cluster a provisioning service to perform provisioning of users, and one of the communication services to support communications between users provisioned in one cluster and between users provisioned on different clusters;

deploy each IaaS platform to a data center, wherein each IaaS platform includes compute, storage, and network resources and an IaaS operating system;

provision users that belong to each organization on the cluster associated with that organization, wherein the provisioning includes storing user information for each user only on the associated cluster; and enable users provisioned on different clusters to communicate with each other as if the users were part of a centralized cloud communication service, without sharing respective user information with the cloud provider.

14. The one or more computer readable storage mediums of claim 13, further comprising instructions to cause the one or more processors to:

configure each IaaS platform remotely from the cloud provider via the IaaS operating system for that platform.

15. The one or more computer readable storage mediums of claim 13, wherein the instructions to cause the one or more processors to deploy to each cluster further include instructions to cause the one or more processors to deploy to each cluster an authentication and authorization service to authenticate and authorize only provisioned users to invoke the other services deployed to the cluster.

16. The one or more computer readable storage mediums of claim 13, wherein the instructions to cause the one or more processors to enable include instructions to cause the one or more processors to:

create a globally accessible domain-to-cluster map to map each cluster to the organization domain uniquely associated therewith; and store in each cluster a locally accessible user-to-cluster map to map that cluster to each user provisioned on that cluster.

17. The one or more computer readable storage mediums of claim 16, wherein:

the instructions to cause the one or more processors to provision users include instructions to cause the one or more processors to store an email address for each user including an organization domain to which the user belongs and a user identifier; and the instructions to cause the one or more processors to enable include instructions to cause the one or more processors to:

receive a request to communicate with a user using a communication service, the request including an email address of the user; and direct the request to the communication service in the cluster uniquely associated with the organization domain to which the user belongs based on the user email address, the domain-to-cluster map, and one of the user-to-cluster maps.

* * * * *